United States Patent [19]

Wakabayashi et al.

[11] Patent Number: 5,610,655
[45] Date of Patent: Mar. 11, 1997

[54] ELECTRONIC APPARATUS WITH A WATERTIGHT HOUSING

[75] Inventors: Manabu Wakabayashi; Kenji Ogiro, both of Yokohama, Japan

[73] Assignee: Hitachi, Ltd., Tokyo, Japan

[21] Appl. No.: 128,003

[22] Filed: Sep. 28, 1993

Related U.S. Application Data

[63] Continuation of Ser. No. 765,910, Sep. 20, 1991, Pat. No. 5,294,988.

[30] Foreign Application Priority Data

Sep. 21, 1990 [JP] Japan ................................ 2-250194
Feb. 7, 1991 [JP] Japan ................................ 3-016338

[51] Int. Cl.⁶ ............................. H04N 5/225; H04N 7/18
[52] U.S. Cl. ............................. 348/373; 348/81; 396/27
[58] Field of Search .......................... 354/64; 348/373, 348/81, 82, 207; H04N 5/225, 7/18

[56] References Cited

U.S. PATENT DOCUMENTS

| | | | |
|---|---|---|---|
| 4,076,663 | 2/1978 | Masuda et al. | 260/17.4 |
| 4,312,580 | 1/1982 | Schwomma et al. | 354/64 |
| 4,774,383 | 9/1988 | Dalton, Jr. | 174/50 |
| 4,986,882 | 1/1991 | Mackey et al. | 162/109 |
| 5,229,246 | 7/1993 | Shibata et al. | 430/217 |

FOREIGN PATENT DOCUMENTS

| | | | |
|---|---|---|---|
| 0164539 | 9/1984 | Japan | G03B 17/08 |
| 1220982 | 4/1989 | Japan | H04N 5/225 |
| 4166922 | 6/1992 | Japan | G03B 17/08 |

*Primary Examiner*—Michael T. Razavi
*Assistant Examiner*—Bipin Shalwala
*Attorney, Agent, or Firm*—Antonelli,Terry, Stout & Kraus, LLP

[57] ABSTRACT

A video camera recorder having a watertight housing including a housing body, a housing bottom and a closure for closing an opening of the housing. The opening is watertightly closed by a watertight structure including an annular bead formed in the housing and a packing provided to the closure. An electronic view finder is watertightly isolated in a space defined between a partition wall, arranged within the housing, and the housing. A cover is provided between the closure and an electronic equipment, such as a video deck, disposed within the housing, and a packing is arranged between the housing and the cover so that the space surrounded by the cover and the housing is held watertightly. Alternatively, the gap between a portion of a video deck disposed in the housing and a housing is watertightly sealed, the portion of the video deck projecting from the housing the opening. A water absorbent or a water sensor is disposed in a recess formed in the housing.

10 Claims, 21 Drawing Sheets

ELECTRONIC APPARATUS WITH A WATERTIGHT HOUSING

CROSS-REFERENCE TO RELATED APPLICATION

This application is a Continuation of U.S. application Ser. No. 765,910, filed Sep. 20, 1991 now U.S. Pat. No. 5,294,988.

BACKGROUND OF THE INVENTION

The present invention relates to an electronic apparatus, a video camera recorder or video camera/recorder for example, having a watertight housing which may be used under water, and, more particularly, to an electronic apparatus with a fail-safe structure which is capable of preventing the inner electronic equipment from being damaged by a water leakage due to degradation in watertightness of an opening portion thereof.

The housing of the conventional video camera recorder has gaps in the video tape cassette inlet, the battery receiving portion, the signal input/output terminal portion, and operation switches, and hence contaminants, moisture, and water drops are liable to enter into the interior of the housing, thereby damaging the magnetic head and the magnetic tape, and restrictions in use such as a temporary stop of use of the video camera recorder due to dew condensation, impermissible use in the rain, etc.

To overcome the problem previously described, a video camera recorder which is enhanced in watertightness by sealing gaps between adjacent parts of the housing is proposed in Japanese Patent Unexamined Publication 1-220982. Video camera recorders with waterproof housings are proposed in Japanese Patent Unexamined Publications Nos. 55-11235 and 55-124129, in which the waterproof housings are each provided with a water leakage function, a water leakage display function and a water leakage treatment function.

In Japanese Unexamined Publication No. 1-220982, the housing is separated into two chambers, each of which is separately opened. For this purpose, an inner housing is provided within the housing to cover both the video camera and the video deck. A gap is however formed between the housing and the inner housing, and thus contaminants and moisture enter into the video camera through the gap and adhere to lenses of the video camera thereby damaging the pictures recorded. Furthermore, when the housing is opened in the hot and wet air, high humidity air enters into the video camera portion. If the housing is closed in such a state, and is transported to a low temperature location such as under water, dew condensation takes place in the air within the housing, lenses of the video camera and the waterproof glasses provided to the housing cloud with the dew condensation, which may result in impossible recording. The Japanese Patent Unexamined Publication No. 55-11235 sets forth a problem as follows. In the previous proposals and existing waterproof constructions, no attention is directed to a water leakage detection technique, a detection means, a leakage display technique, and how to deal with a water leakage. Even if a sufficient waterproof construction is provided, waterproofness of the waterproof construction is not complete from points of durability and strength, taking the movable portions and the openable portions into account. Thus, the waterproof video camera recorder requires functions of detection of water leakage, display of water leakage, and water leakage treatment.

The Japanese Unexamined Publication No. 1-220982 however does not disclose such functions. Video cameras disclosed in Japanese Patent Unexamined Publications Nos. 55-11235 and 55-124129 have these functions but raise problems in functions of water leakage detection and water leakage detection treatment. More specifically, in each of the Japanese Patent Unexamined Publications Nos. 55-11235 and 55-124129, a water leakage detection unit is provided around the opening portion of the housing, and is exposed to the surface of the housing when a rear closure is opened. Thus, the water-leakage detection unit is likely to malfunction because of moisture and a trace amount of water. Furthermore, the capacity of water leakage detection is liable to deteriorate due to adhesion of finger prints and contaminants such as dust. Regarding the water leakage treatment, Japanese Patent Unexamined Publication No. 55-11235 proposes that the film which watertightly coats the moisture absorbent is broken to absorb moisture; and a pump mechanism is provided so that compressed air is accumulated within the video camera by an operational force in winding the film, and, according to water leakage information, the compressed air is injected into the inside of the camera to thereby raise pressure within the camera. However, this publication does not disclose any more specific constructional features. Japanese Patent Unexamined Publications No. 55-124129 proposes an attempt such that a compressed air cartridge is provided within the housing and, in dependence upon a signal from a water leakage detector, the compressed air is allowed to fill the inside of the housing to apply an excessively high pressure to the housing to thereby prevent the water leakage from the non watertight portion. No disclosure is made as to how to deal with water which has entered in the housing, and hence there is a possibility that the water damages the electronic equipment within the housing while the camera is being pulled up from the water after the user received a water leakage alarm.

SUMMARY OF THE INVENTION

Accordingly, it is an object of the present invention to provide a video camera recorder capable of overcoming the problems encountered in the prior art, and including a housing excellent in watertightness, and capable of effectively preventing contaminants such as dust and moisture from entering a video camera accommodating portion of the housing when the closure of the housing is opened.

Another object of the present invention is to provide an electronic apparatus, more particularly a video camera recorder which includes a watertight housing having a fail safe structure. The fail safe structure prevents a water leak from damaging the electronic equipment due to the water leak entering into the electronic equipment by absorbing the water leak and displaying a water leak alarm even if, during use of the video camera recorder under water, water enters into the housing due to deterioration in watertightness of the opening portion of the housing. The water leak alarm alerts the user to stop the use of the video camera recorder and to pull the video camera recorder out of water.

To achieve these and other objects, one aspect of the present invention is directed to a video camera recorder of the type including a housing, and a video camera and a video deck placed within the housing. A partition wall for partitions an inner space of the housing to define a video camera accommodating space in which the video camera is accommodated, with watertight means for watertightly sealing the video camera accommodating space.

According to another aspect of the present invention there is provided opening defining means to one side of the housing, and a battery and a video tape cassette are inserted and taken out through the opening. Recording and reproducing switches and signal input/output terminals of the video deck are provided in the housing in the vicinity of the opening defining means. Furthermore, a partition wall with watertight means partitions an inner space of the housing to define a first space and a second space. The first space accommodates at least one of the video deck and an electric view finder (EVF), whereas, the second space at least one of the video deck, the battery receiving means, the video operating switches, and the signal input/output terminals.

Portions to insert and take out a video cassette tape and a battery, signal input/output terminals, and video operating switches are collected in the housing in the vicinity of one opening, thereby minimizing the number of the openings in the housing.

The partition wall and the watertight means prevent water or air from communicating between at least one of the video camera and the EVF, and the opening. In the housing at least one of the video camera and the EVF is placed in a space independent watertightly and airtightly, and hence dusts and moisture outside the housing are prevented from contacting the lenses when the closure of the opening is opened. Furthermore, in assembling of the video camera recorder it is possible to seal dried extremely low humidity air in the independent space in which at least one of the video camera and the EVF is located, and even if the video camera recorder is placed at low temperature locations, for example, under water, the lenses and the window glass of the housing are hence previously prevented from being internally clouded since air within the spacing does not reach to a dew condensation point.

Still another aspect of the present invention is directed to an electronic apparatus of the type including a housing having opening defining means for defining an opening, a closure member for closing the opening defining means, sealing means for watertightly sealing between the opening defining means and the closure member, and electronic equipment arranged within the housing. A cover member is interposed between the closure member and the electronic equipment and packing means are interposed between the cover member and the housing, for a watertight interconnection between the cover member and the housing.

When a video camera recorder with the housing with a watertight construction as described above is used in the water, a water pressure is applied to the housing. Watertightness of the opening of the housing may deteriorate if a grain of sand or hair is clamped in the packing which serves to secure the watertightness between the closure and the housing or if the packing becomes degraded. This causes water to leak into the housing. The cover member disposed inside the closure member to watertightly seal the opening of the housing blocks water, which leaks in the housing, from entering the electronic equipment in the housing. The electronic equipment incorporated in the housing is doubly protected from leak water. No water pressure is directly applied to the cover member, and hence the required watertightness between the cover member and the housing is low as compared to the watertightness between the closure and the housing.

Preferably, the sealing means comprises recess defining means for defining a recess in the opening defining means to surround the opening; and a water sensor, disposed within the recess, for sensing water.

The recess which is provided in the opening defining means is lower than other portions in the opening defining means, and hence leak water flows in the recess. The water detective sensor disposed in the recess detects water leak, and produce a water leakage alarm according to the detection.

In another preferred mode of the present invention, the sealing means comprises recess defining means for defining a recess in the opening defining means to surround the opening, and water absorbing means, disposed within the recess, for absorbing water.

The water absorbent placed in the recess serves to absorb and hold leakage water. In the present invention, a water absorptive polymer which is used for a paper diaper may used as the water absorbent. The water absorptive polymer is capable of absorbing an amount of water larger than the conventional water absorptive paper, and furthermore holds the absorbed water in so as to prevent leakage to the outside.

DESCRIPTION OF THE PREFERRED EMBODIMENTS

Figure 1:
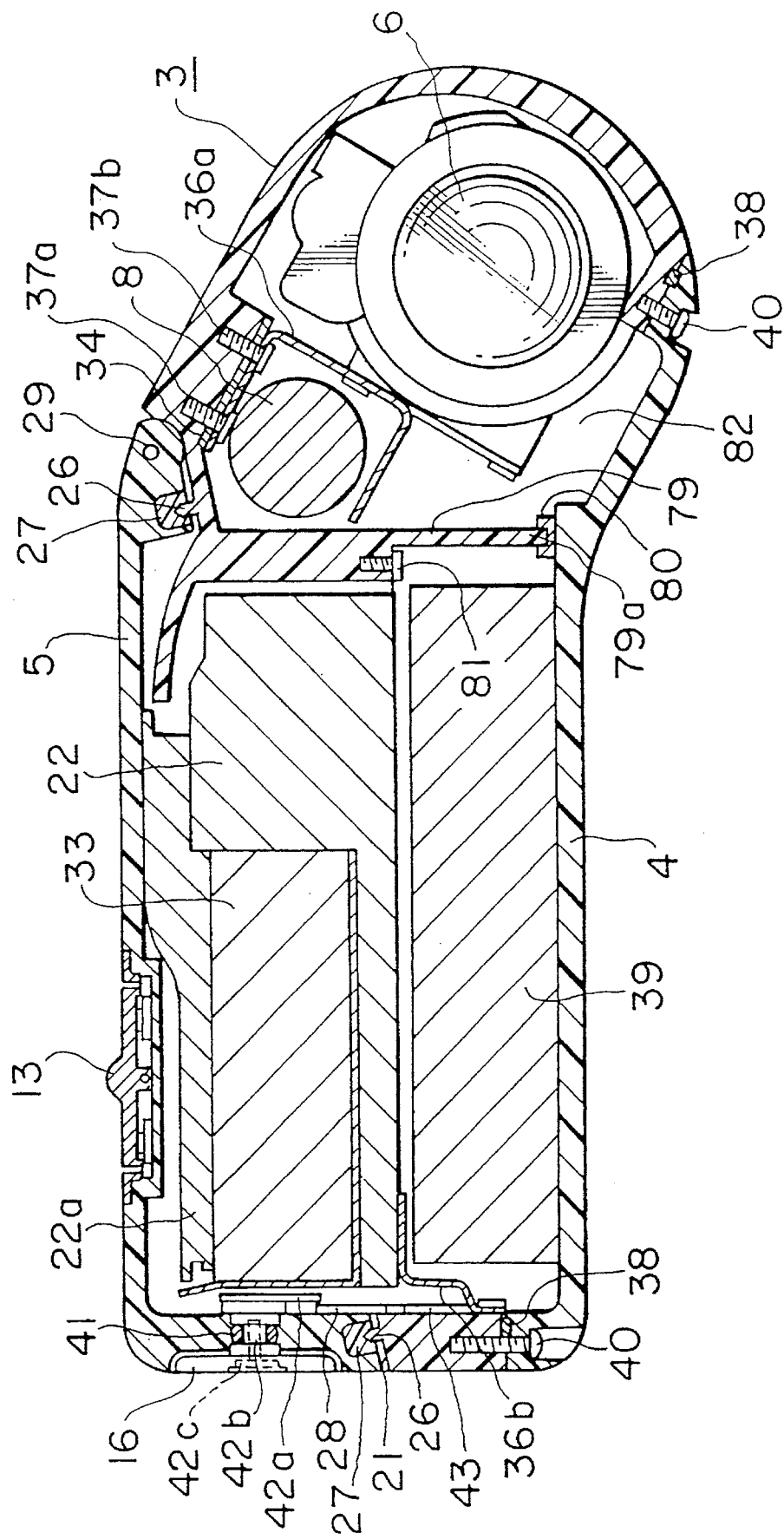
FIG. 1 is a sectional view of a video camera recorder as one embodiment of the present invention, taken along the line I—I in FIG. 2.
Figure 2:
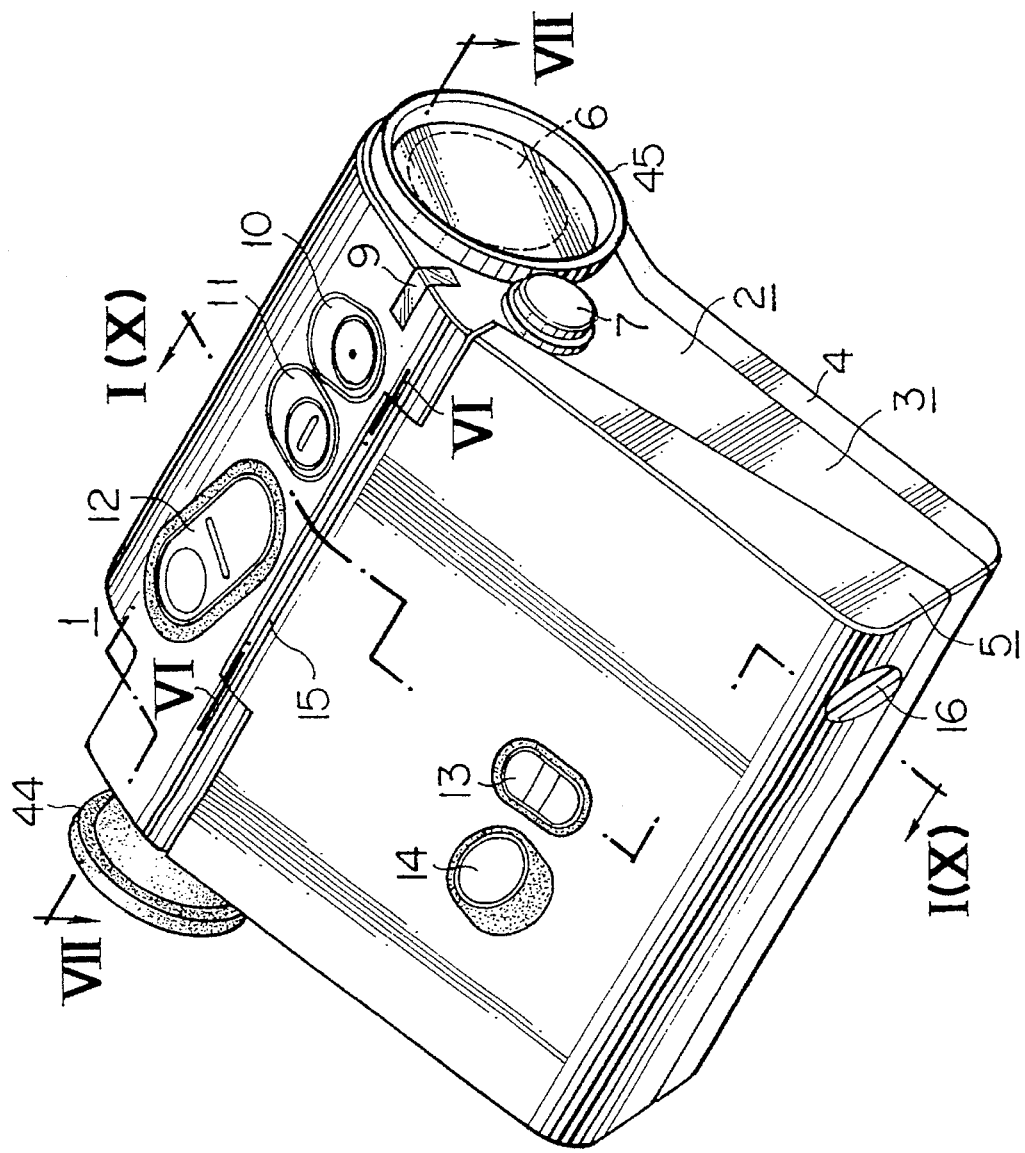
FIG. 2 is a perspective view of the video camera recorder of FIG. 1 with the closure closed as viewed from the front left side thereof.
Figure 3:
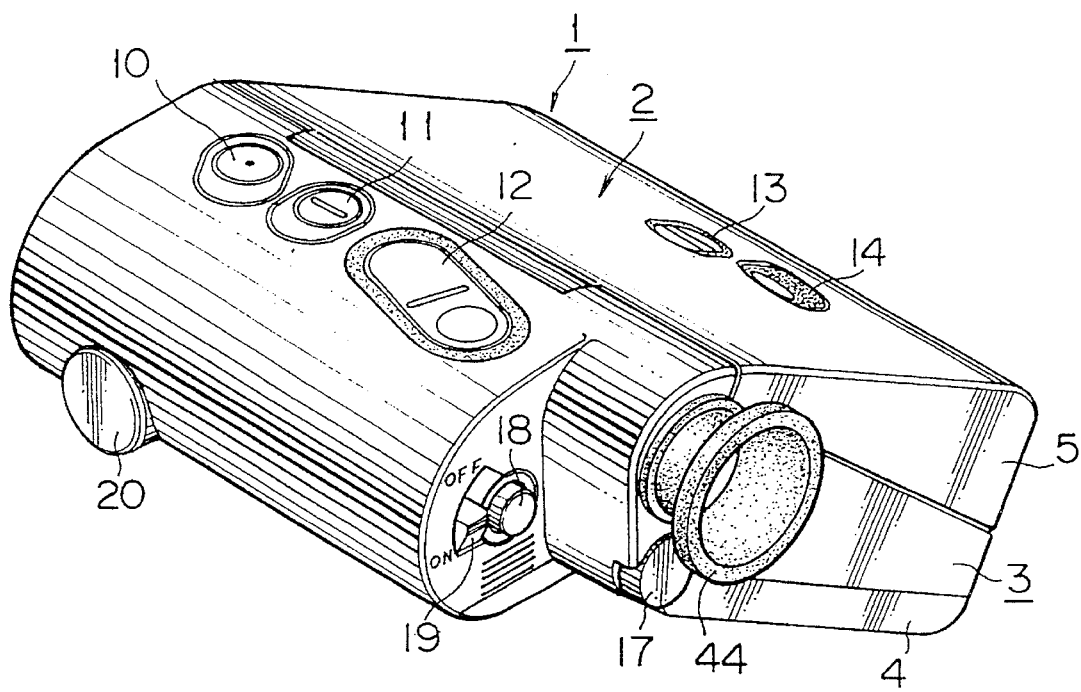
FIG. 3 is a perspective view of the video camera recorder of FIG. 2 as viewed from the rear right side thereof.

A video camera recorder according to the present invention, in the embodiment of FIGS. 1–3 includes a housing 3, a video camera 6, a microphone 7, and an electric view finder (EVF) 8. The housing 2 includes a housing body 3, a housing bottom 4 and a closure 5. The closure 5 is pivotally supported at a hinged portion 15 thereof to the housing body 3. The closure 5 is provided at the side wall thereof with a cover locking knob 16 for releasably locking the closure 5 to the housing body 3. On the upper surface of the closure 5 there are arranged a zoom button 13 and a right hand recording switch 14. As shown in FIG. 2, the housing body 3 is provided at a front portion thereof with a microphone 7 and a zoom lens of the video camera 6. Furthermore, on the upper surface of the housing body 3 there are disposed a tarry lamp 9 to indicate recording, a counterlight correction button 10, a fade button 11, and a left hand zoom button 12. As shown in FIG. 3, the housing body 3 is provided at the rear portion thereof with an eye piece 44 of the EVF 8, a diopter adjusting dial 17, a left hand recording button 18, and a power switch lever 19. As also shown in FIG. 3, the housing body 3 has a manual focusing dial 20 disposed at one side thereof.

When the power is turned on by turning the power switch level 19 in the counterclockwise direction in FIG. 3, the video camera recorder turns in a camera mode, and images shot by the video camera 6 are displayed on the EVF 8. Upon pushing the right hand recording button 14 or the left hand recording button 18, recording is started. Focusing is usually carried by an autofocusing mechanism incorporated but may be carried out by manually turning the manual focus dial 20. It becomes possible to conduct zooming of an object by operating the right hand zoom button 13 or left hand zooming button 12. In the case where an object is to be shot with intense counterlight, the counterlight correction button 10 is used. In the start or end of the shooting, the fade button 11 may be used for enhancing edition effects. Voices are collected from the microphone 7.

Figure 4:
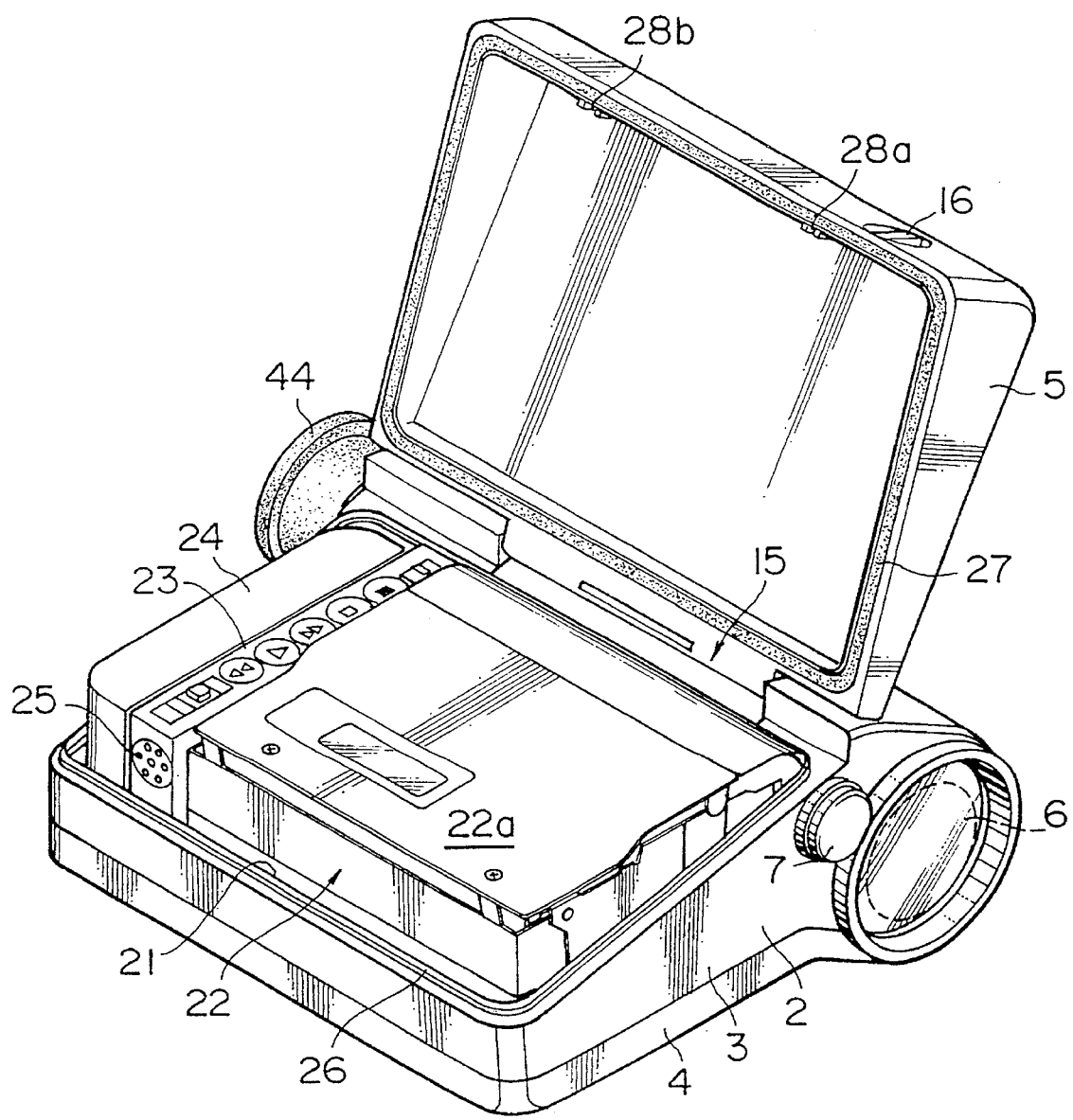
FIG. 4 is a perspective view of the video camera recorder of FIG. 1 with the closure opened.

FIG. 4 is a perspective view of the video camera recorder shown in FIGS. 2 and 3 with the closure 5 open, and illustrates how the video camera recorder operates. A pair of cover locking pawls 28a and 28b are arranged on the inner side wall of the closure 5. The cover locking pawls 28a and 28b are laterally moved by turning the cover locking knob 16. A packing 27 is annularly fitted in the whole lower rectangular open edge of the closure 5. The housing body 3 has a substantially rectangular opening 21. A video deck 22, a video operating switches 23, a signal input/output terminals 25 and a battery 24 are placed in the housing body 3, and partly project from the housing body 3 through the opening 21. An annular bead 26 is formed in the substantially rectangular edge which defines the opening 21.

Signals outputted from the video camera 6 and the microphone 7 and signals inputted from the signal input/output terminals 25 are recorded in the video deck 22. Recording and reproducing are conducted in the video deck 22 by operating the video operating switches 23. Signals reproduced are output from the signal input/output terminals 25 and may be confirmed in the EVF 8.

The video deck 22 is provided with a cassette inlet opening 22a through which a video tape cassette 33 (FIG. 1) may be inserted or ejected.

The battery 24 supplies electric power to the video camera 6 and the video deck 22. The battery 24 is inserted into and taken out from the housing body 3 through the opening 21.

The bead 26 formed to surround the opening 21 is brought into contact with the packing 27, and is resiliently stuck in the packing 27 for watertight sealing of the housing 2 when the closure 5 is locked to the housing body 3 by the cover locking pawls 28a and 28b. The bead 26 is formed in the shape of an annular bank to surround the opening 21, and hence serves to block dusts or water drops, which flow down from the upper portion of the closure 5 when the closure 5 is opened, from entering into the opening 21, so that these substances flow outside the housing body 3.

Figure 6:
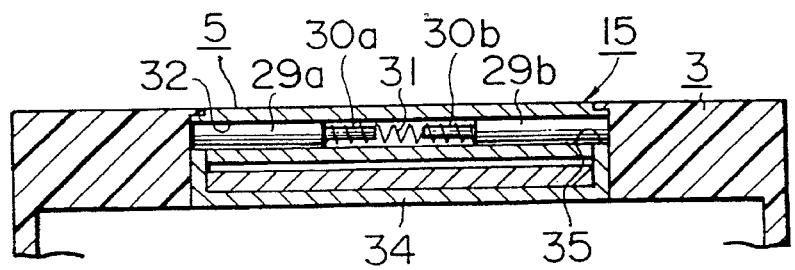
FIG. 6 is a sectional view of the video camera recorder taken along the line VI—VI of FIG. 2.
Figure 5:
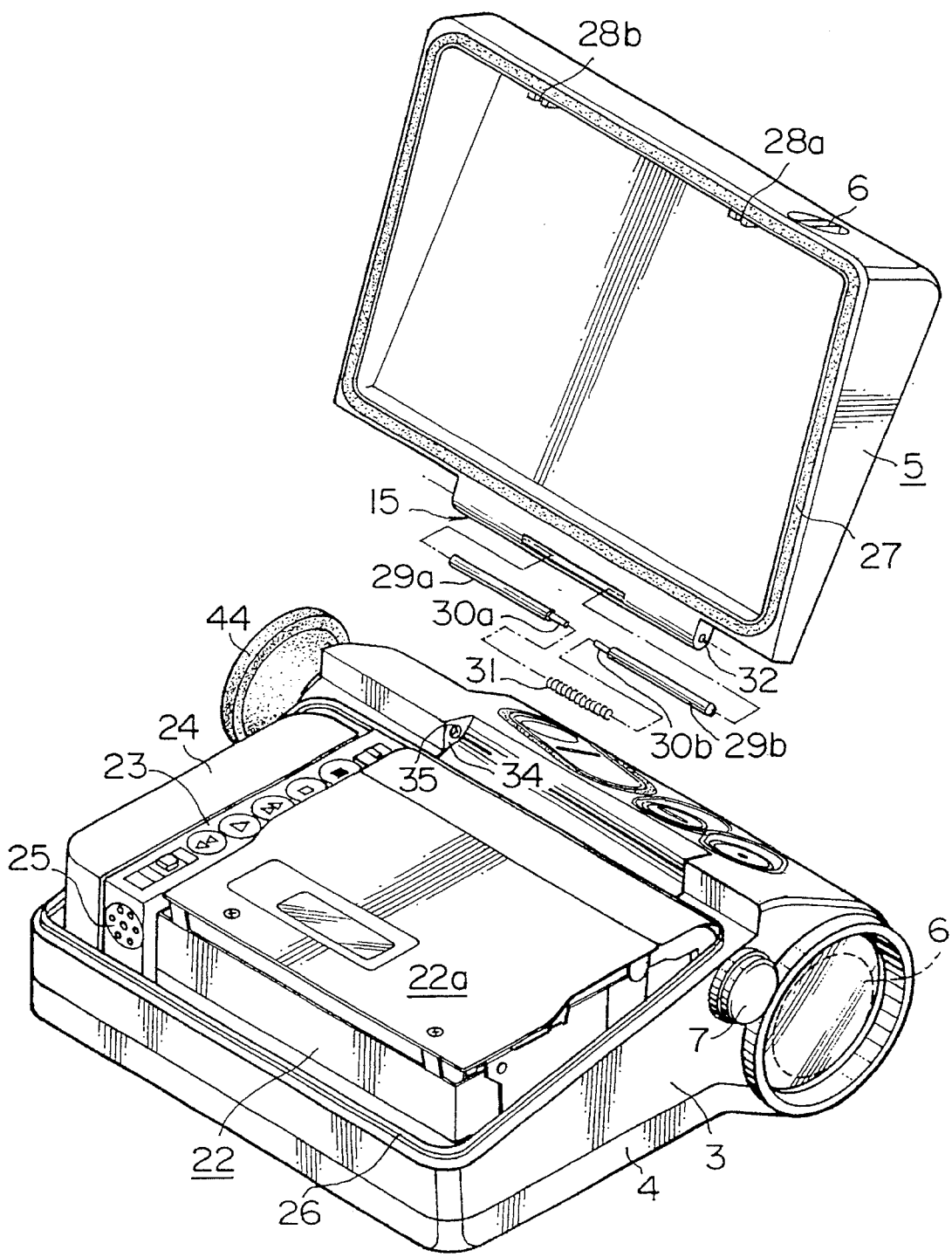
FIG. 5 is an exploded view of the video camera recorder of FIG. 1 with the closure removed.

FIG. 5 is an exploded perspective view of the hinged portion 15 of FIG. 4. FIG. 6 is a fragmental view taken along the line VI—VI of FIG. 2. The hinged portion 15 includes a pair of hinge shafts 29a and 29b, a coil spring 31, a through shaft hole 32 formed in the rear end of the closure 5, a body hinge 34, and a pair of body shaft holes 35 and 35. The body hinge 34, and a pair of body shaft holes 35 and 35 are provided in a substantially central portion of the rear portion of the housing body 3.

The spring 31 is a coil spring, and is fitted around spring receiving portions 30a and 30b of the hinge shafts 29a and 29b for spring biasing the hinge shafts 29a and 29b to axially move away from each other as shown in FIG. 6. The hinge shafts 29a and 29b and the spring 31 are inserted into the shaft hole 32, and thus the outer ends of the hinge shafts 29a and 29b are projected from the shaft hole 32. When the closure 5 is assembled in the housing body 3, the outer ends of the hinge shafts 29a and 29b hence fit into respective body shaft holes 35 and 35 of the body hinge 34 to thereby form the hinged portion 15.

As shown in FIG. 1, the video camera 6, the EVF 8, the video deck 22 and a electronic circuit 39 are incorporated into the housing 2. The video camera 6 and the EVF 8 are fastened within the housing body 3 through a part holder 36a. The video deck 22 is also fastened within the housing body 3 through a part holder 36b and screws 81a, 81b and 81c.

The body hinge 34 is secured to an inner wall of the housing body 3 together with video camera 6 and the EVF 8 through screws 37a and 37b when the part holder 36a is fastened in the housing body 3. The body hinge 34 passes through the housing body 3 from the inside to the outside thereof. After the body hinge 34 is assembled in the housing body 3, a silicon rubber or the like material is injected under pressure into the gap between the body hinge 34 and the housing body 3, and thereby a watertight structure is formed.

As previously described, the packing 27 is fitted in the closure 5, and is brought into abutment to the bead 26 to form a watertight structure of the opening 21. The right-hand zoom button 13 is made of rubber, of which periphery is attached to the closure 5 to thereby form a watertight structure. The right-hand recording button 14 is also attached at the periphery thereof to the closure 5. The left-hand zoom button 12, the counterlight correction button 10 and the fade button 11 are secured at peripheries thereof to the housing body 3 for forming watertight structure.

As illustrated in FIG. 1, the housing button 4 is fastened to the housing body 3 through a fastening screw 40 with a bottom packing 38 sandwiched between them, so that a watertight structure is formed at the bottom portion of the housing.

The cover locking knob 16 is secured to a cover locking pawl slide shaft 42b through a screw 42c, and the cover locking pawl slide 42b is integrally formed with the cover locking pawl slide lever 42a. An O-ring 41 is placed under pressure between the cover locking pawl slide shaft 42b and the closure 5 for forming a watertight structure in the cover locking pawl slide shaft 42b. The housing body 3 is provided with a fixed pawl 43, which meshes with the cover locking pawls 28a and 28b to sealingly close the closure 5. The cover locking pawl slide lever 42a is turned by turning the cover locking knob 16, and thereby the cover locking pawls 28a and 28b are sled, so that the cover locking pawls 28a and 28b are disengaged from the fixed pawl 43. Thus, the closure 5 may be opened.

As illustrated in FIG. 1, a partition wall 79 is integrally formed with the housing body 3, and the distal end 79a thereof is brought in contact with the housing bottom 4 through a partition wall packing 80 to define a space 82. The partition wall packing 80 forms a watertight structure of the space 82 by resilient deformation. The partition wall 79 partitions the space 82 of the video camera 6 and the EVF 8 and the space of the video deck 22 and the electronic circuit 39. Thus, the space 82 does not communicate with the opening portion 21 in the air and moisture, and is independent of the opening portion 21. By sealing dried low moisture air in the space 82 this structure previously prevents accidents due to moisture: the video camera 6 and the EVF 8 are clouded with moisture; and a watertight glass 46 (FIG. 7) of the housing body 3 is clouded in the inside surface thereof.

Figure 7:
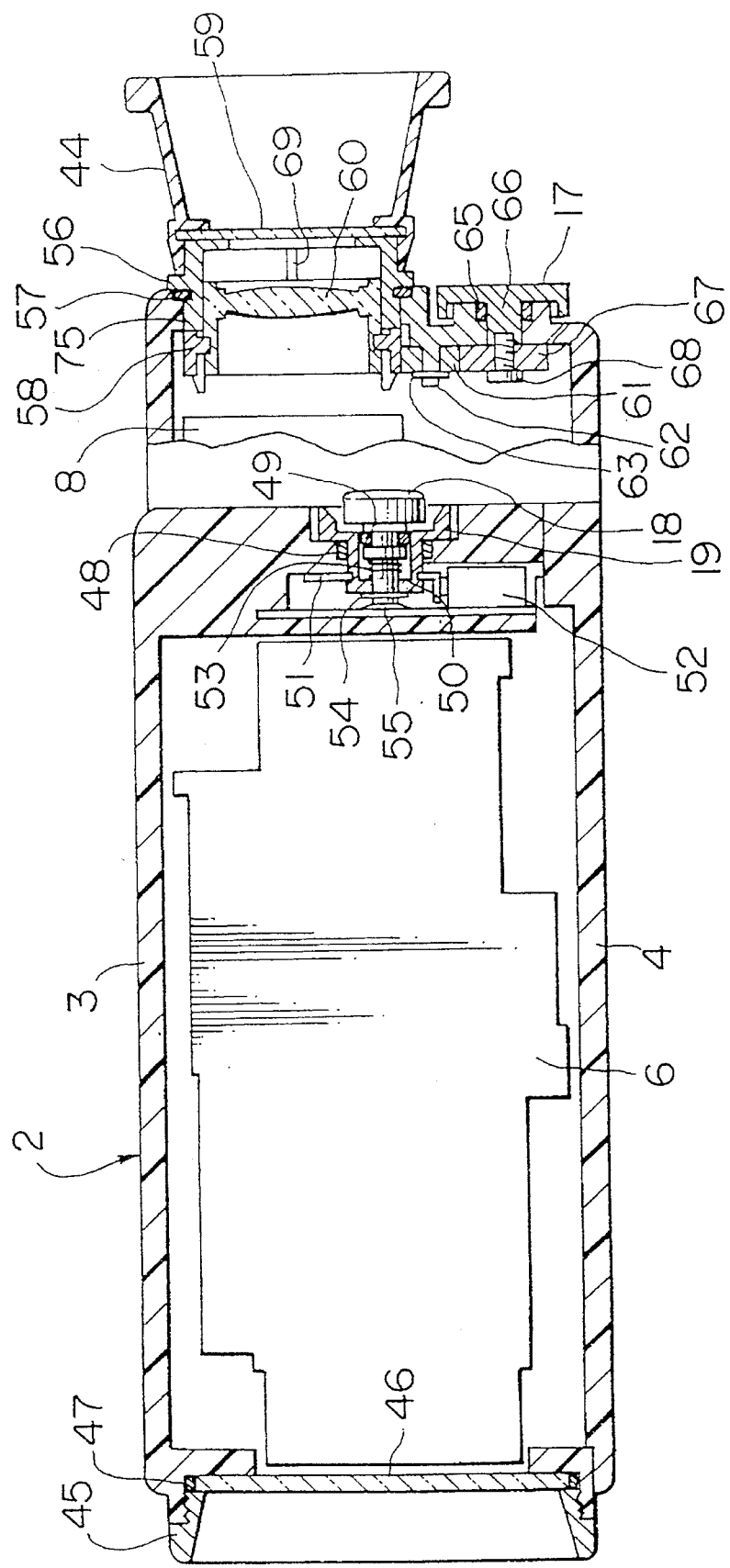
FIG. 7 is a sectional view of the video camera recorder taken along the line VII—VII in FIG. 2.

As shown in FIG. 7, the video camera 6 is placed within the housing 2. In front of the video camera 6 the watertight glass 46 is disposed whereas in the rear there are arranged a power switch 52 and a left hand recording switch 55. In a rear portion of the housing body 3 a macro lens 60 and the diopter adjusting dial 17 are disposed.

An O-ring 47 is placed under pressure between the watertight glass 46 and the housing body 3, and the watertight glass 46 is secured to the housing body 3 by a watertight glass ring 45 which engages with the housing body 3 in a threaded manner.

An O-ring 48 is placed under pressure between the power switch lever 19 and the housing body 3, and also, between the power switch lever 19 and the left hand recording button shaft 50, there is located, under pressure, another O-ring 49. The rear end of the power switch lever 19 is provided with a rotary lever 51 to prevent slipping out from the housing body 3, and the rotary lever 51 serves to turn on and off the power switch 52. The left hand recording button shaft 50 is resiliently biased by a coil spring 53 toward the outside of the housing 2 but an E-ring 54 is mounted around the shaft 50 for preventing slipping out. When the left hand recording button 18 is pushed against this biasing force, the distal end of the left hand recording button shaft 50 turns on the left hand recording switch 55 to start recording.

Figure 8:
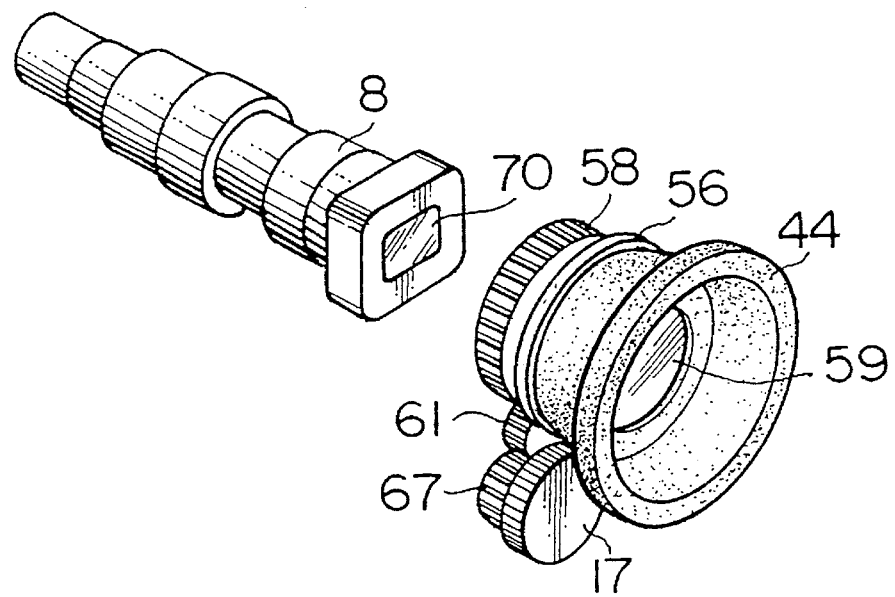
FIG. 8 is a perspective view of the diopter adjusting mechanism of the EVF of FIG. 1.
Figure 9:
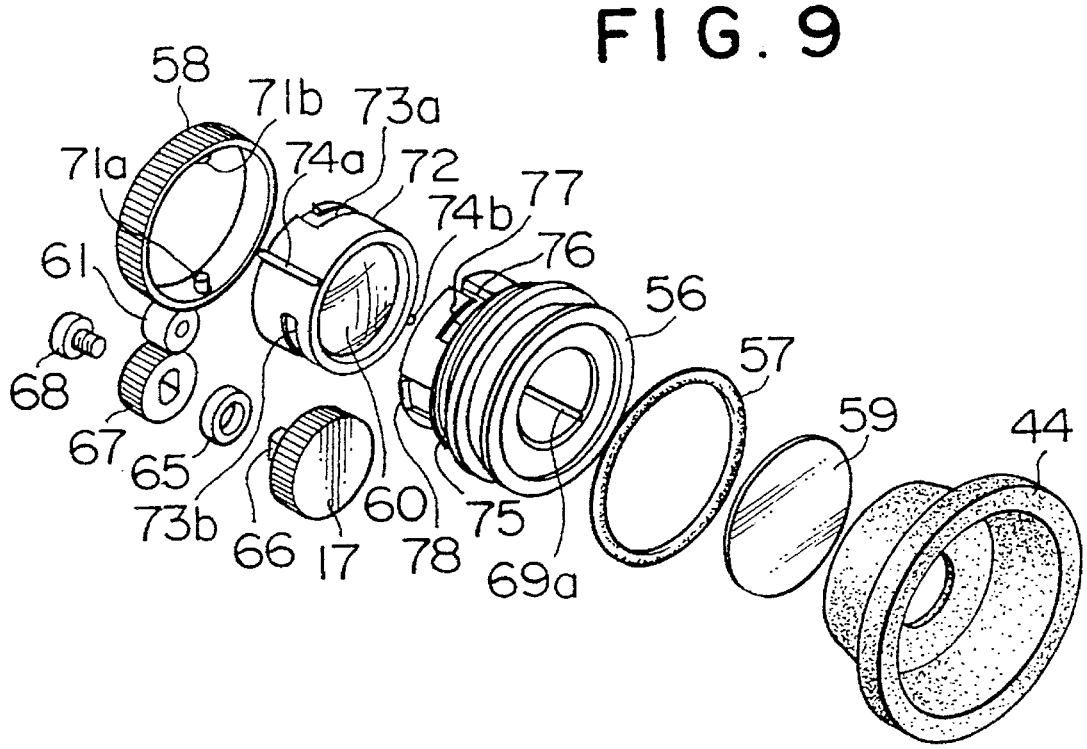
FIG. 9 is an exploded perspective view of the diopter adjusting mechanism of FIG. 8.

The diopter adjusting mechanism of the EVF 8 is described with reference to FIGS. 7 to 9.

The diopter adjusting mechanism includes an EVF housing 56, the macro lens 60, a lens drive ring 58, the diopter adjusting dial 17, a dial pulley 67 and an intermediate pulley 61.

The macro lens 60 enlarges the display screen 70 of the EVF 8, and the magnification thereof is 2 or 3. Visual power depends on each person, and hence it is necessary to move the macro lens 60 in the optical axial direction for focusing.

The macro lens 60 is held within a macro lens housing 72, which is provided in the outer circumference thereof with a pair of ridges 74a and 74b symmetrically formed about the axis thereof and further with two spiral grooves 73a and 73b. On the other hand, a pair of guide grooves 69a and 69b are formed in the inner circumferential face of the EVF housing 56 symmetrically about the axis thereof (the lens guide groove 69b is not shown). The guide grooves 69a and 69b engage with the ridges 74a and 74b of the macro lens housing 72 to slidably support the macro lens housing 72 in the optical axis direction. The lens drive ring 58, turnable around the EVF housing 56, is provided on the inner circumferential surface thereof with a pair of projections 71a and 71b, which fit in corresponding spiral grooves 73a and 73b on the outer circumferential surface of the macro lens housing 72. Accordingly, the macro lens 60 is axially moved by turning the lens drive ring 58 according to the principle of screw. The two projections 71a and 71b pass through respective vertical slits 76 and 76 formed through the rear end portion of the EVF housing 56, and turn around the EVF housing 56 in circumferential slits 77 (the vertical slits 76 and 76 and circumferential slits 77 and 77) are radially formed through the EVF housing 56. A pawl 78 is formed with the rear end of the EVF housing 56 for preventing slipping out of the lens drive ring 58.

The EVF housing 56 is fastened at a threaded portion 75 (FIG. 7) to the housing body 3. An O-ring 57 is placed under pressure between the EVF housing 56 and the housing body 3 for providing a watertight structure. An eye piece 44 is fitted around the EVF housing 56 for forming a hood to prevent the incoming of outer light between the eye and the macro lens 60.

The diopter adjusting dial 17 is rotatably supported on the housing body 3 through a dial shaft 66 thereof. The dial shaft 66 has the dial pulley 67 fitted around a portion thereof within the housing body 3. The dial pulley 67 is attached to the dial shaft 66 by a screw 68. An O-ring 65 is placed under pressure between the dial shaft 66 and the housing body 3 to provide a watertight structure.

Arranged between the dial pulley 67 and the lens drive ring 58 is the intermediate pulley 61 for transmitting torque of the diopter adjusting dial 17 to the lens drive ring 58. As shown in FIG. 7, the intermediate pulley 61 is rotatably supported around a pulley shaft 62, fixed in the housing body 3, and is prevented from slipping out of the shaft 62 by an E-ring 63.

Figure 10:
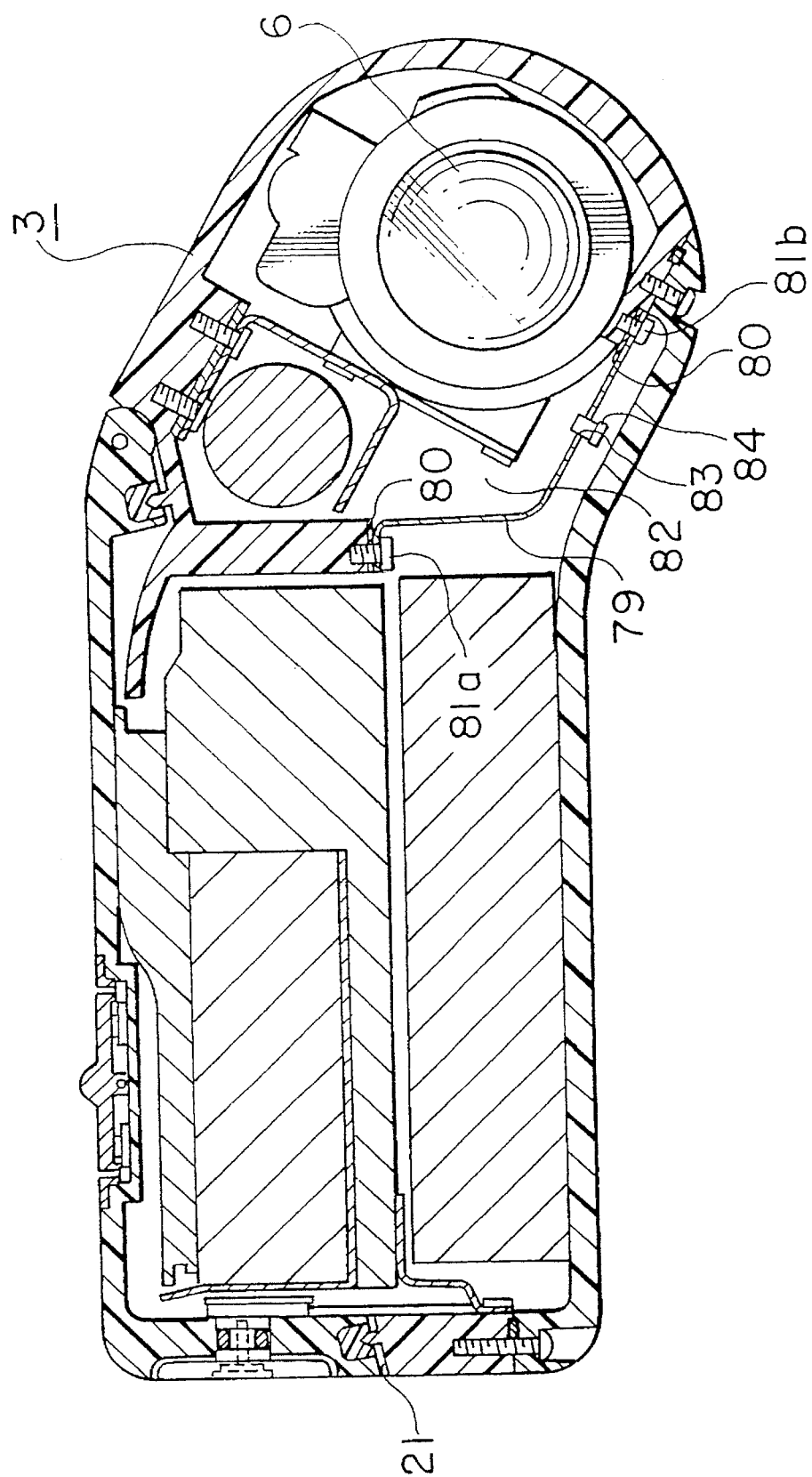
FIG. 10 is a sectional view of a video camera recorder as a second embodiment of the present invention, taken along the line X—X in FIG. 2.
Figure 11:
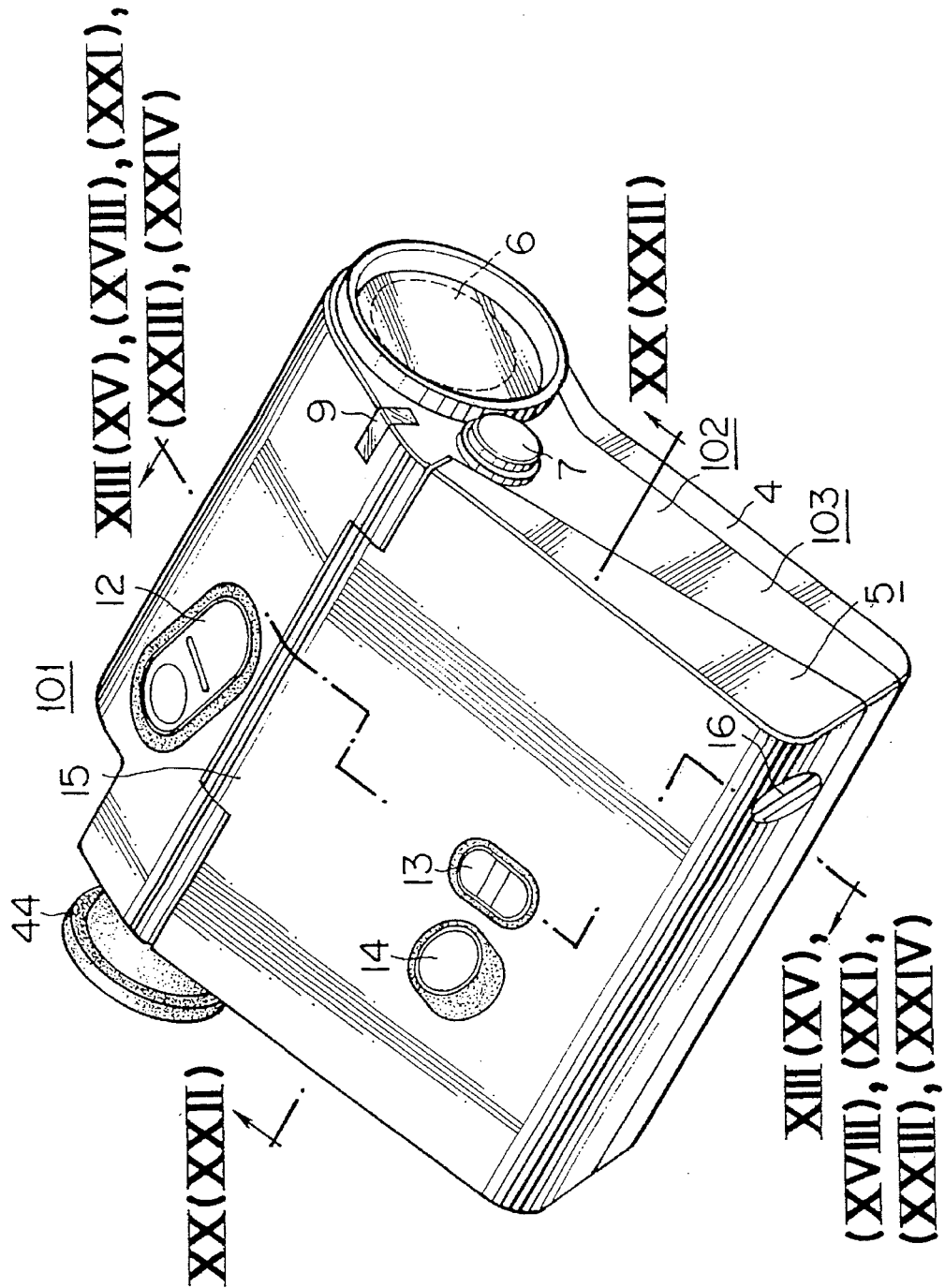
FIG. 11 is a perspective view of a video camera recorder as a third embodiment of the present invention, as viewed from the front left side thereof with the closure closed.
Figure 12:
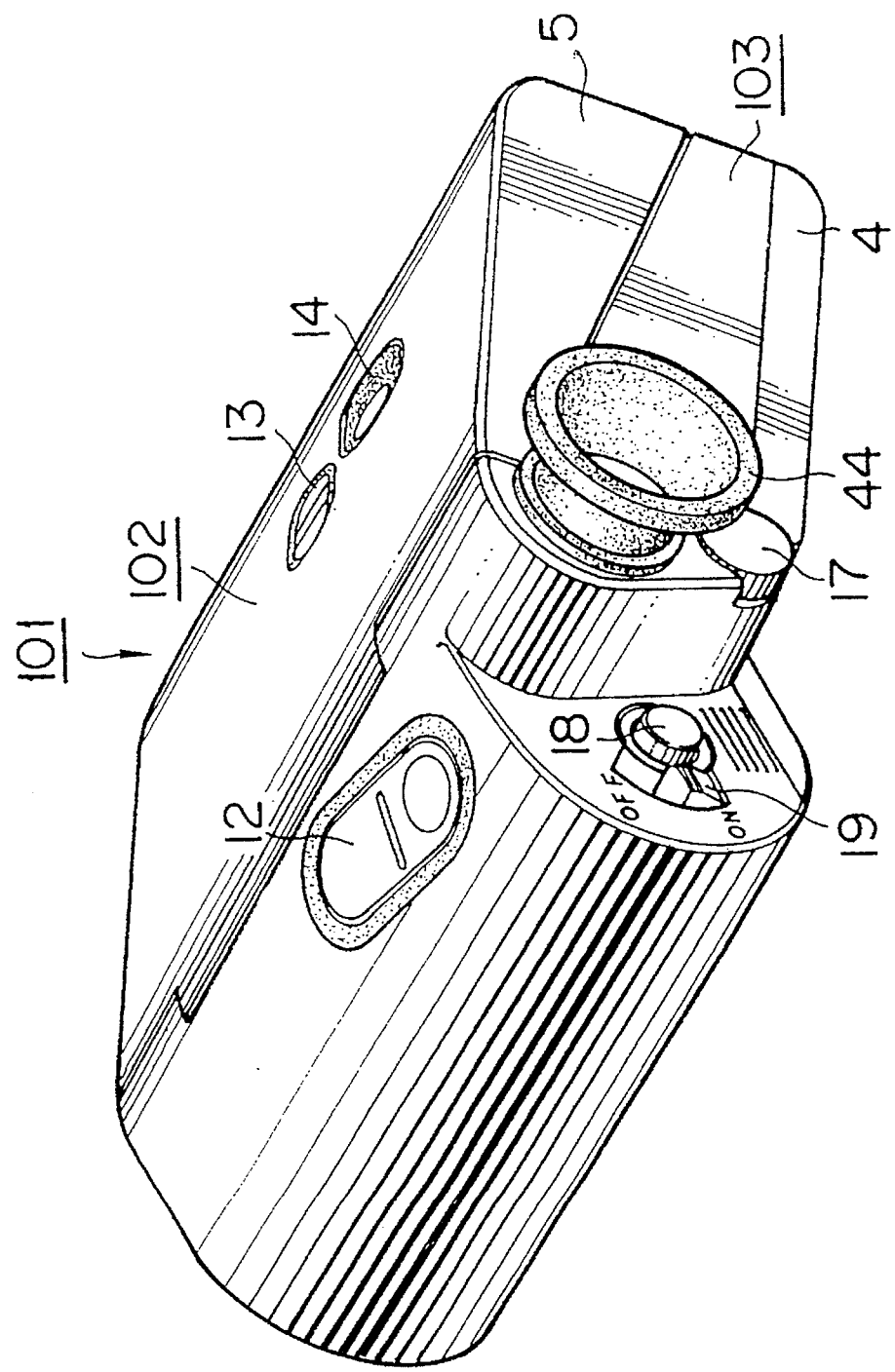
FIG. 12 is a perspective view of a video camera recorder of FIG. 11 as viewed from the rear right side thereof.
Figure 13:
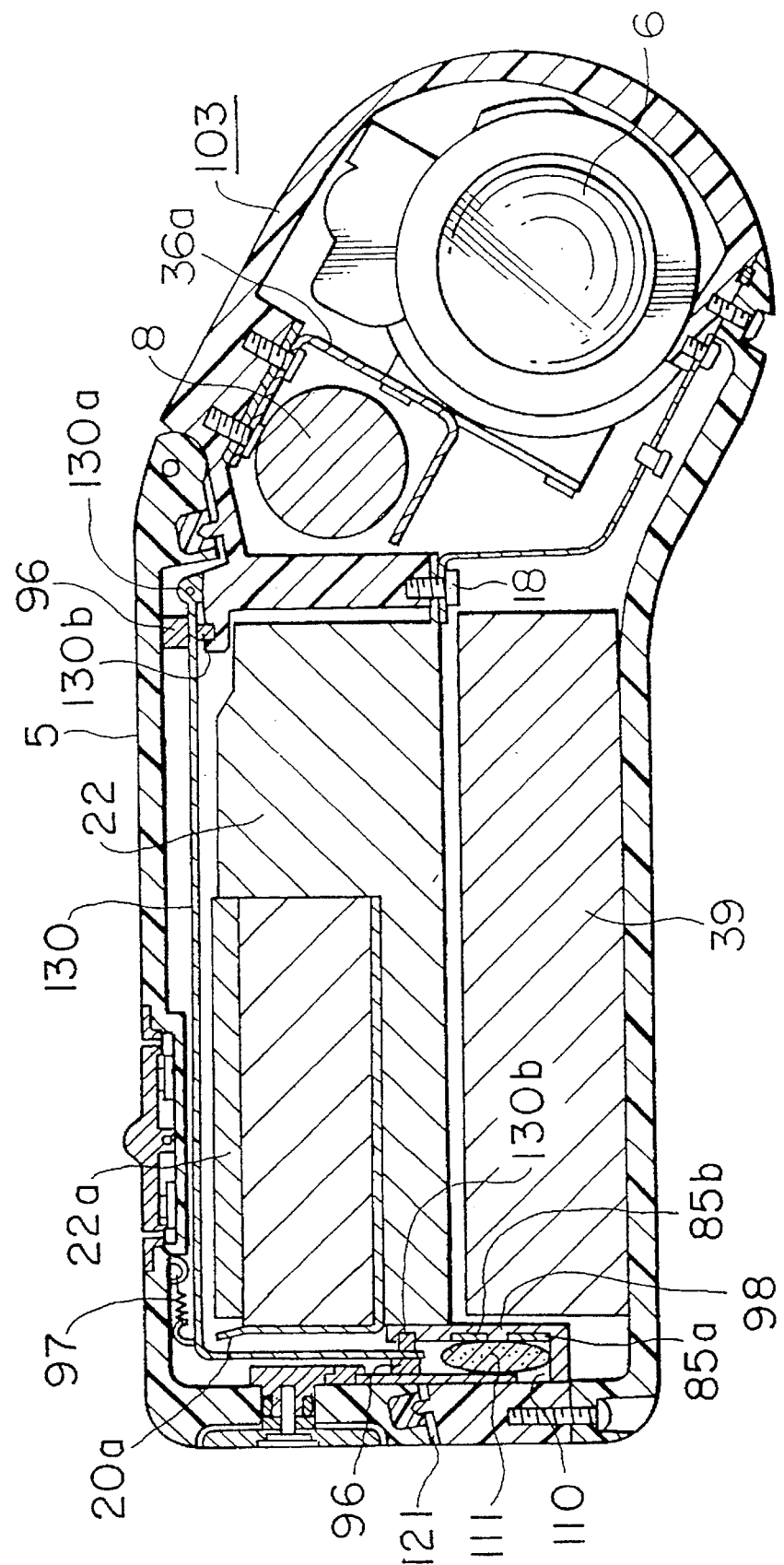
FIG. 13 is a sectional view of the video camera recorder taken along the line XIII—XIII of FIG. 11.
Figure 14:
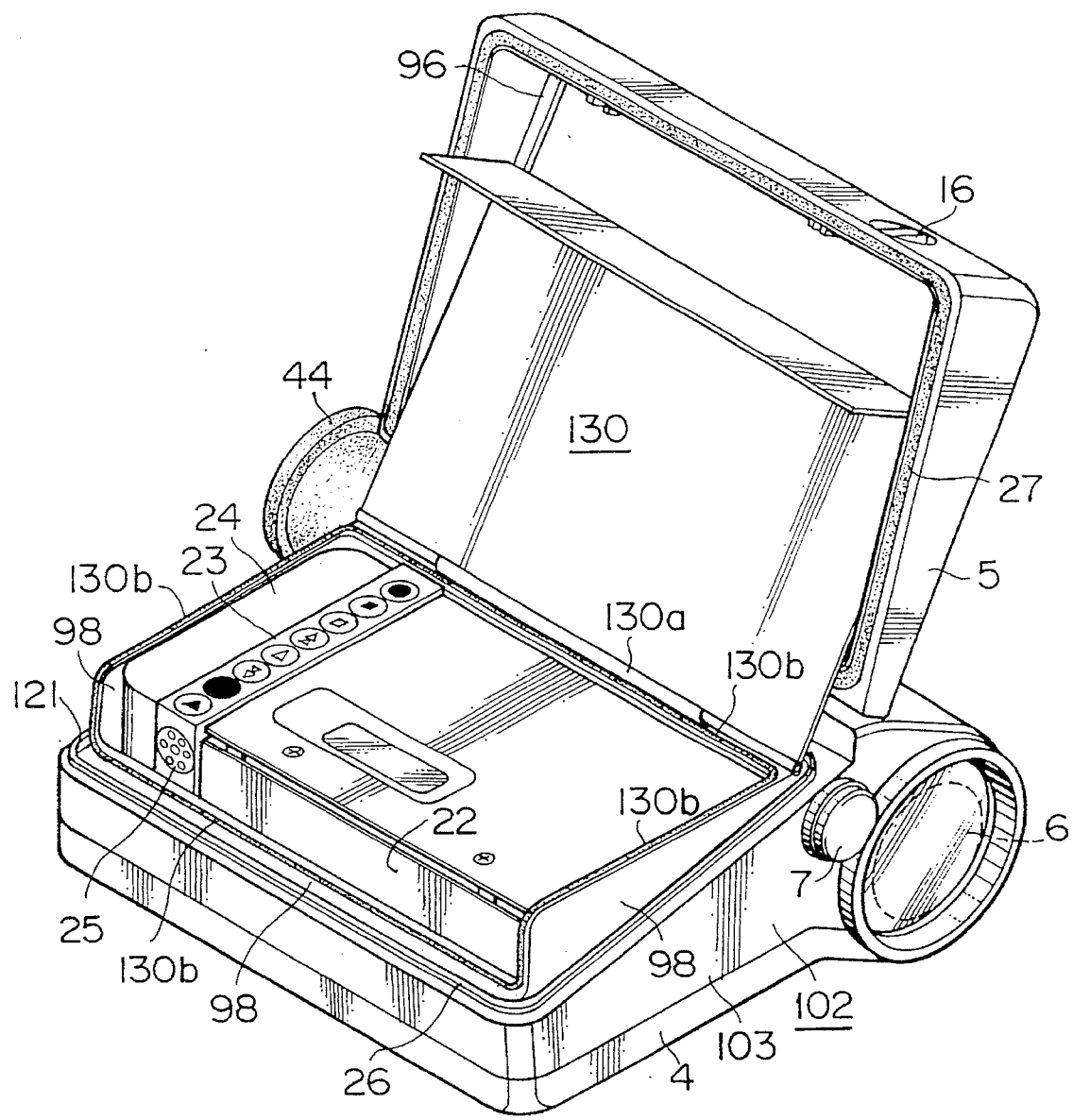
FIG. 14 is a perspective view of the video camera recorder of FIG. 11 with the closure opened.
Figure 15:
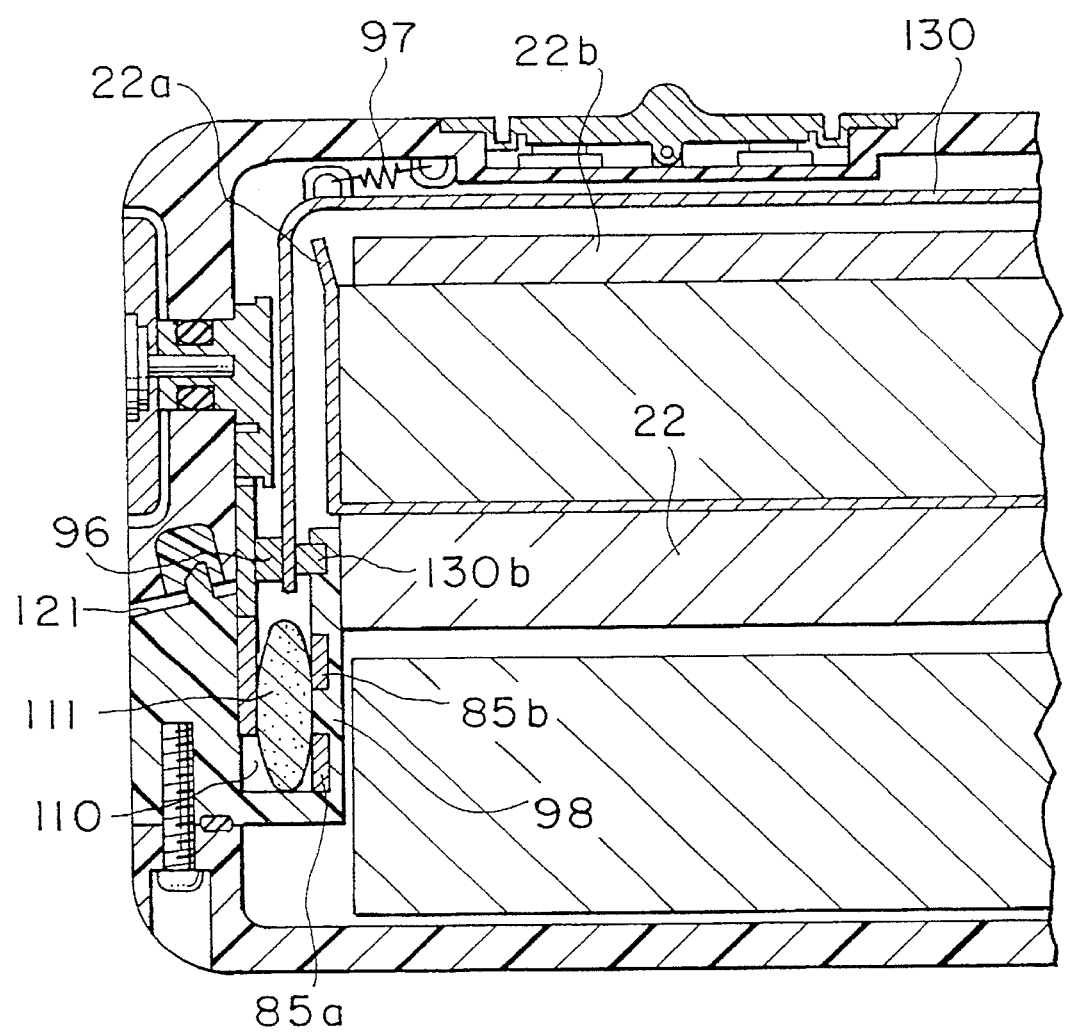
FIG. 15 is an enlarged sectional view of the video camera recorder taken along the line XV—XV of FIG. 11.

Except the partition wall 79, the parts of the video camera recorder are identical to those of the video camera recorder of FIG. 10 of FIG. 1, and descriptions thereof are omitted. The partition wall 79 is fastened to the housing body 3 through screws 81a and 81b. A partition wall packing 80 is inserted between the partition wall 79 and the housing body 3. The partition wall 79 is provided with an injection through hole 83, which is closed by a plug 84. Thus, the space 62 in which the video camera 6 and the EVF 8 are located is an independent watertight chamber, and hence air and water does not communicate between the opening portion 21 and the space 82. In assembling the video camera recorder, the space 82 is easily filled with dried air by closing it with a plug 84 after dried air is injected through the injection hole 83. Moreover, it is possible to remove the partition wall 79, and this facilitates assembling of the video camera 6 and the EVF 8.

FIGS. 11 to 15 illustrate a video camera recorder 101 as a third embodiment of the present invention. Parts corresponding to parts of the first embodiment in FIGS. 1 to 7 and those of the second embodiment in FIG. 10 are designated by the same reference numerals, and descriptions thereof are simplified or omitted.

A housing 102 is provided with an opening portion 121 which is closed by a closure 5. Within the opening portion 121, an inner wall 98 is integrally formed with the housing body 103. The inside of the opening portion is covered with a cover 130 pivotally supported to the housing body 103 through a cover higher 130a.

The video camera 6, the EVF 8, the video deck 22 and a circuit 39 are incorporated into the housing 102. The video camera 6 and the EVF 8 are fastened within the housing body 103 through an equipment supporting plate 36a. The video deck 22 is mounted to the inside of the housing body 103 through the inner wall 98 and the screw 81a.

A groove 110 is formed between the inner wall 98 and the housing body 103. Two water detective sensors 85a and 85b are fitted in the inner wall at positions which face the groove 110. A water absorbent 111 is placed in the groove 110. The water absorbent 111 is a water absorptive polymer wrapped with a hydrophilic material. The water absorptive polymer is taught in Japanese Patent Unexamined Publication No. 2-142565.

The water detective sensors 85a and 85b each include an electrically conductive terminals which are located in the groove 110 at a predetermined interval. When a water leak takes place, it stays in the groove 110. When the leak increases, and the level thereof reaches to the sensor 85b, the resistance between the sensors 85a and 85b varies. According to the detected change in resistance it is judged that a leak takes place.

In the case where as the water detective sensors 85a and 85b, variable resistance dew condensation sensors, which are made of a resin dispersed system including conductive particles and a moisture sensitive polymer film, are used, a rapid change in resistance occurs when condensation takes place. Thus, when the water detective sensors 85a and 85b get wet in surfaces thereof, they rapidly change in resistance. Based on this fact it is judged that there is water leakage. It is possible to give the following alarms: a primary leak alarm is provided in the case where only the water detective sensor 85a gets wet whereas a secondary leak alarm is given in the case where both the water detective sensors 85a and 85b become wet. In the latter case, it is judged that a large amount of water leakage has taken place.

Figure 16:
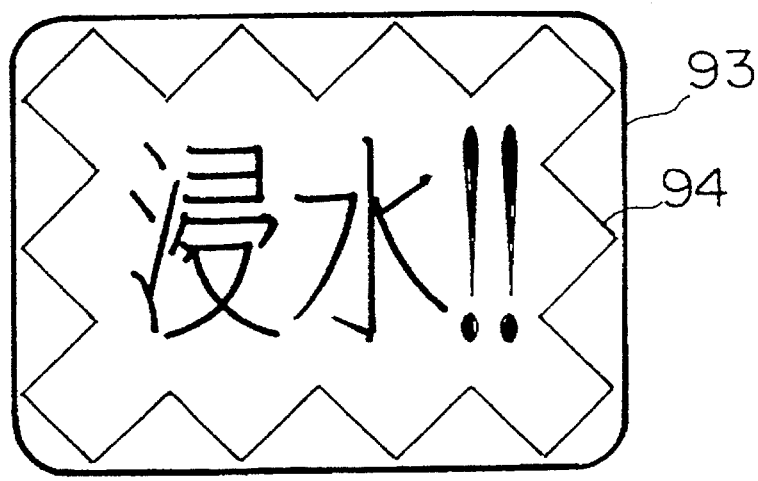
FIG. 16 is a view illustrating a display of a water leakage alarm.
Figure 17:
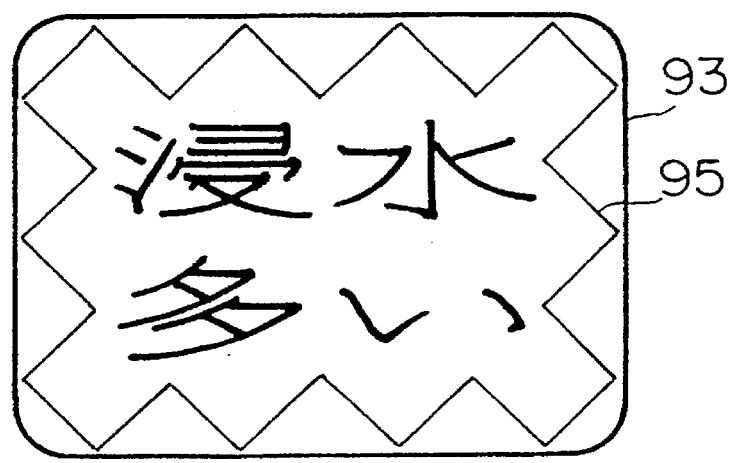
FIG. 17 is a view showing a display of a secondary water leakage alarm.

FIG. 16 illustrates a leak alarm 94 displayed on the screen of an EVF monitor 83. FIG. 17 shows one example of the secondary leak alarm 95. Significant impressions may be given by flickering the alarm 94 and 95.

An endless cover packing belt 130b is fitted in the housing body 103 and the inner wall 98, and the cover 130 is forced to adhere to the cover packing belt 130 to provide a watertight structure. A cover holder 96 is secured to the inside of the closure 5, and when the closure 5 is closed, the cover holder 96 presses the cover 130 to be enhanced in watertightness. The closure 5 and the cover 130 are interconnected by a connecting member 97, which may be a tension coil spring or a mere string. Thus, by opening the closure 5 the cover 30 which is connected to the closure 5 through the connecting member 97 is turned about the cover hinge 130a, so that the video deck 22, the video operating switches 23, the battery 24 and the signal input/output terminals 25 within the housing 102 are exposed.

A fourth embodiment of the present invention is illustrated in FIGS. 18 to 21, in which among various kinds of the electronic equipment placed in the opening portion 221, only the video deck 22 which should be waterproof is covered with a cover 230, and the battery 24 which does not require waterproofing, and the sealable video operating switches 23 and signal input/output terminals 25 are not covered.

Figure 21:
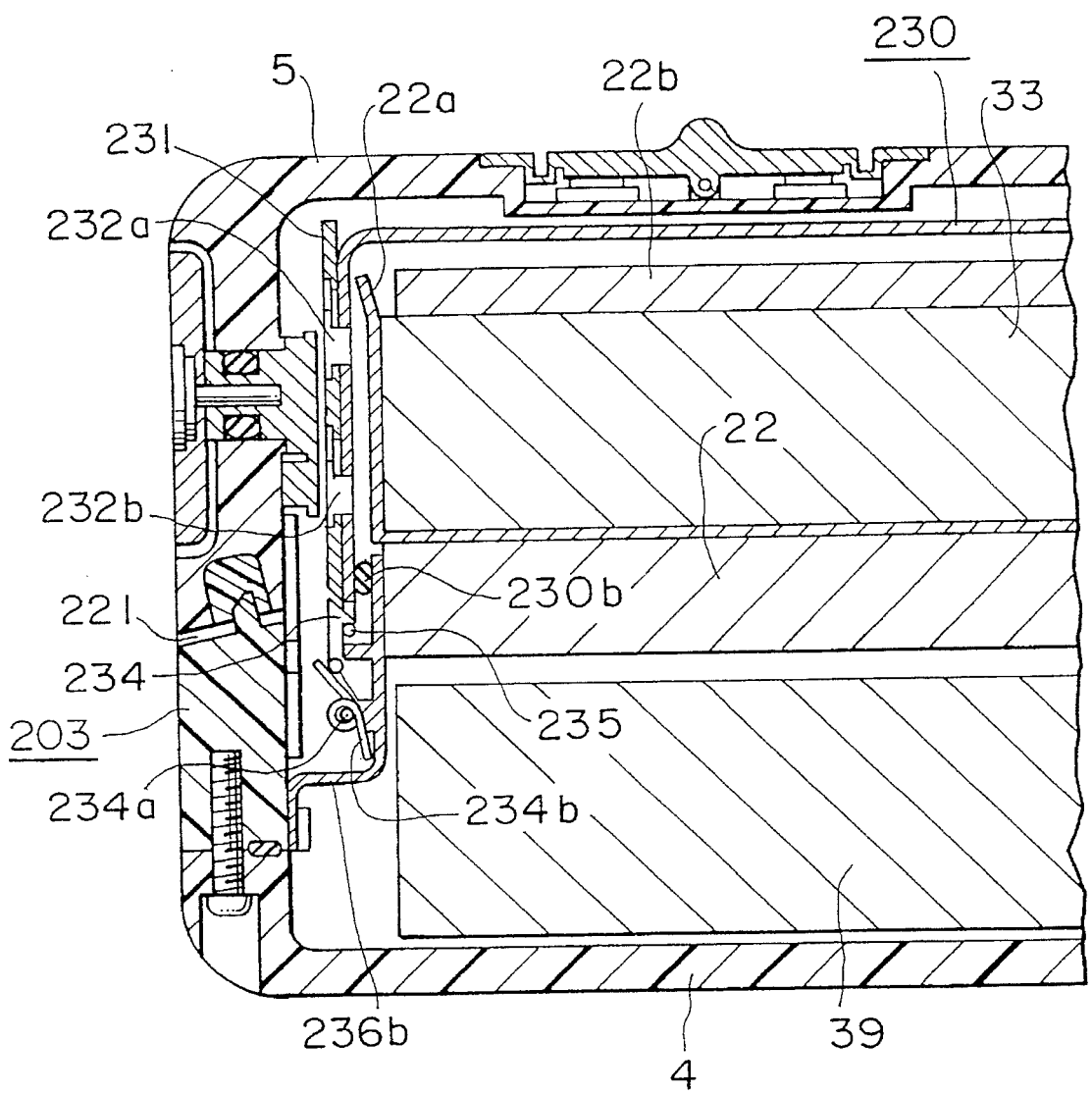
FIG. 21 is a fragmentary sectional view of the video camera recorder of FIG. 18, taken along the line XXI—XXI of FIG. 11.

The video deck 22 is secured to the inside of the housing body 203 through an equipment holder plate 236b and screws 81a. The gap between the equipment holder plate 236b and the housing body 203 is kept watertight. Parts which are distinct from those of the third embodiment described with reference to FIGS. 13 and 14 will be described hereinafter. As shown in FIG. 21, the cover 230 is pivotally supported to the housing body 203 through a cover hinge 230a. A locking rod 235 which is integrally attached with the cover 230 is engaged with a locking pawl 234 for locking the locking pawl 235 rotatably supported to the equipment holder plate 236b. An endless cover packing belt 230b is clamped between the cover 230 and the housing body 203 to form a watertight structure. The locking pawl 234 is pivotally supported on a hinge 234a provided to the equipment holder plate 236b, and is biased by a torsion coil spring 234b toward the cover 230. The locking pawl 234 has an inclined surface at the head thereof, and the inclined surface is brought into contact with an inclined surface of the lower end of a lock releasing lever 231. Thus, by depressing the lock releasing lever 231 the lock pawl 234 is rotated about the hinge 234a, so that it is disengaged from the lock rod 235.

The battery 24 is disposed in a recess 210 defined by the housing body 203 and a waterproof wall 88. Below the battery 24 there is disposed a grid 86, below which is arranged a water absorbent 111. A water detective sensor 85 is arranged below the water absorbent 111 so that the sensor is brought into close contact to the bottom of the housing bottom 4.

As the water detective sensor 85, a variable resistance dew condensation sensor, which is made of a resin dispersed system including conductive particles and a moisture sensitive polymer film, is used, and hence a rapid change in resistance occurs when condensation takes place. Thus, when the water detective sensor 85 gets wet in a surface thereof, it rapidly changes in resistance. Based on this fact it is judged that there is water leakage.

The video operating switches 23 are covered with a plastic sheet 90, and are kept watertight.

A cover 230 is inserted between the video deck 22 and the closure 5. An endless cover packing belt 230b is clamped between the cover 230 and the housing body 203 and between the cover 230 and the video operating switches 23 to form a watertight structure. Thus, the video deck 22, circuits 39 and 89 are located in a watertight space. With such a construction, a water leak from the opening portion 221 passes over the cover and flows in the recess 210. The water which flowed into the recess 210 passes through the grid 86, so that it wets the water detective sensor 85, and is absorbed into the water absorbent 111.

When the battery 24 is placed in the recess 89, two terminal plates 92a and 92b thereof come into electrical contact with terminals 91a and 91b fixed to the waterproof wall 88, so that the video deck 22 and the circuits 39 and 89 are energized. The terminals 91a and 91b are provided to the waterproof wall 88, and hence no leakage occurs in the terminals.

Figure 20:
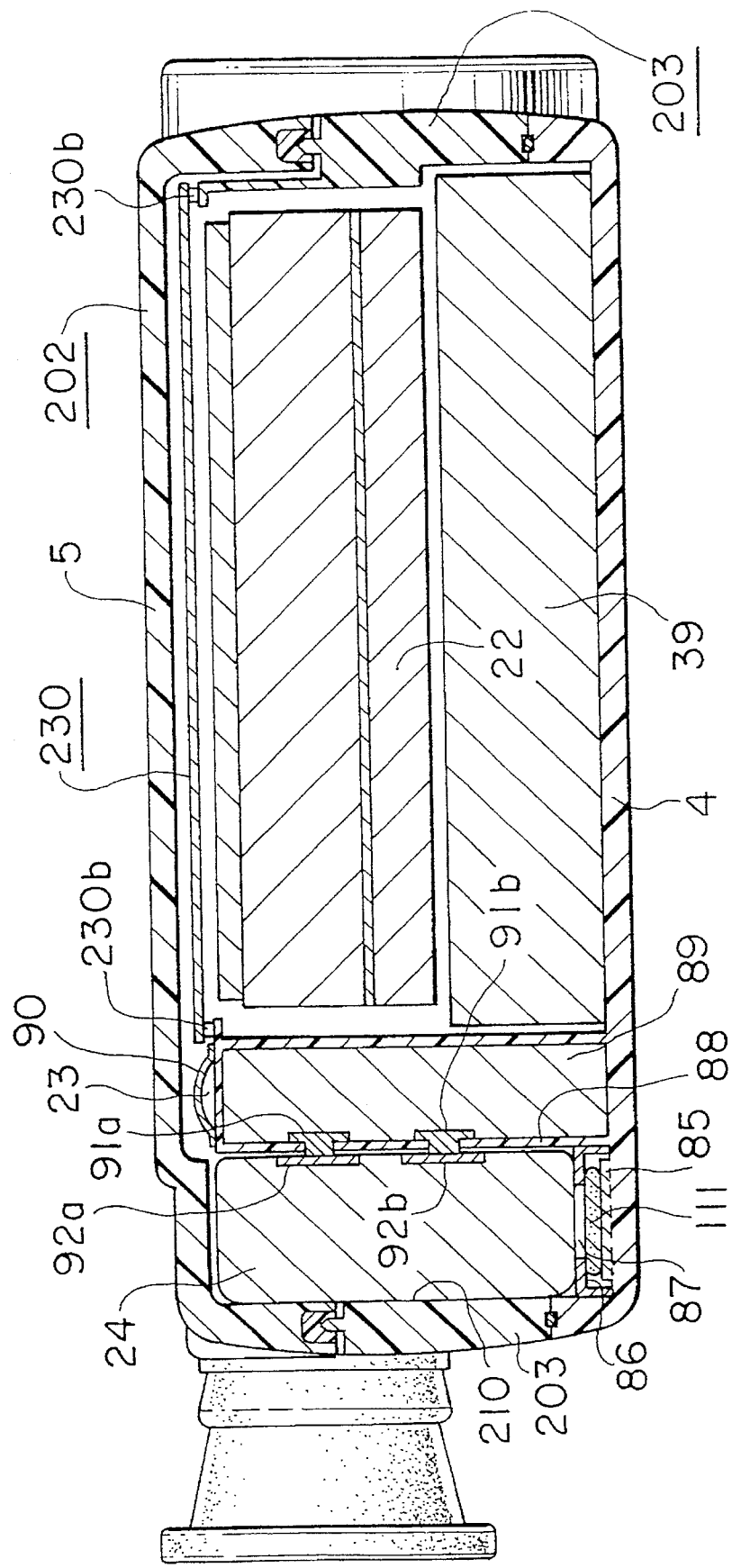
FIG. 20 is a sectional view of the video camera recorder of FIG. 18, taken along the line XX—XX in FIG. 11.
Figure 22:
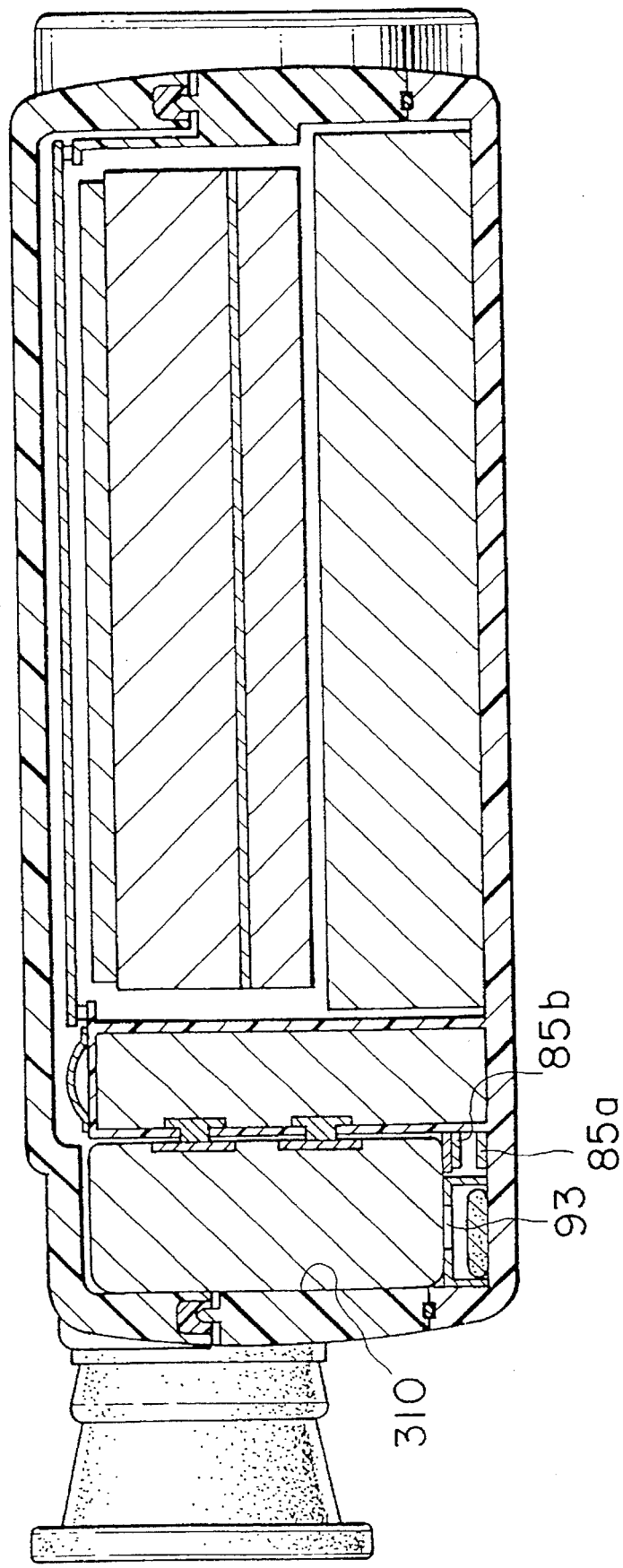
FIG. 22 is a sectional view of a video camera recorder as a fifth embodiment of the present invention, taken along the line XXII—XXII of FIG. 11.

FIG. 22 illustrates a fifth embodiment of the present invention, and only parts which are distinct from parts of the fourth embodiment shown in FIG. 20 will be described. The water detective sensors 85a and 85b are disposed at the lowermost portion of a recess 310. The water detective sensor 85a is secured to the buttom surface of the housing bottom 4, whereas, the water detective sensor 85b is attached to the lower surface of a recess buttom plate 93 located above the water detective sensor 85a. The water detective sensors 85a and 85b are each provided with an electrically conductive terminal, and are disposed at a predetermined interval. When a water leak takes place, it stays in the recess 310. When the leak increases, and the level thereof reaches to the sensor 85b, the resistance between the sensors 85a and 85b varies. According to the detected change in resistance it is judged that a leak takes place.

If the water detective sensors 85a and 85b use terminals of the same substance as the sensor 85, it is possible to give the following: a primary leak alarm is provided in the case where only the water detective sensor 85a gets wet whereas a secondary leak alarm is given in the case where both the water detective sensors 85a and 85b become wet. In the latter case, it is judged that a large amount of water takes place.

Figure 18:
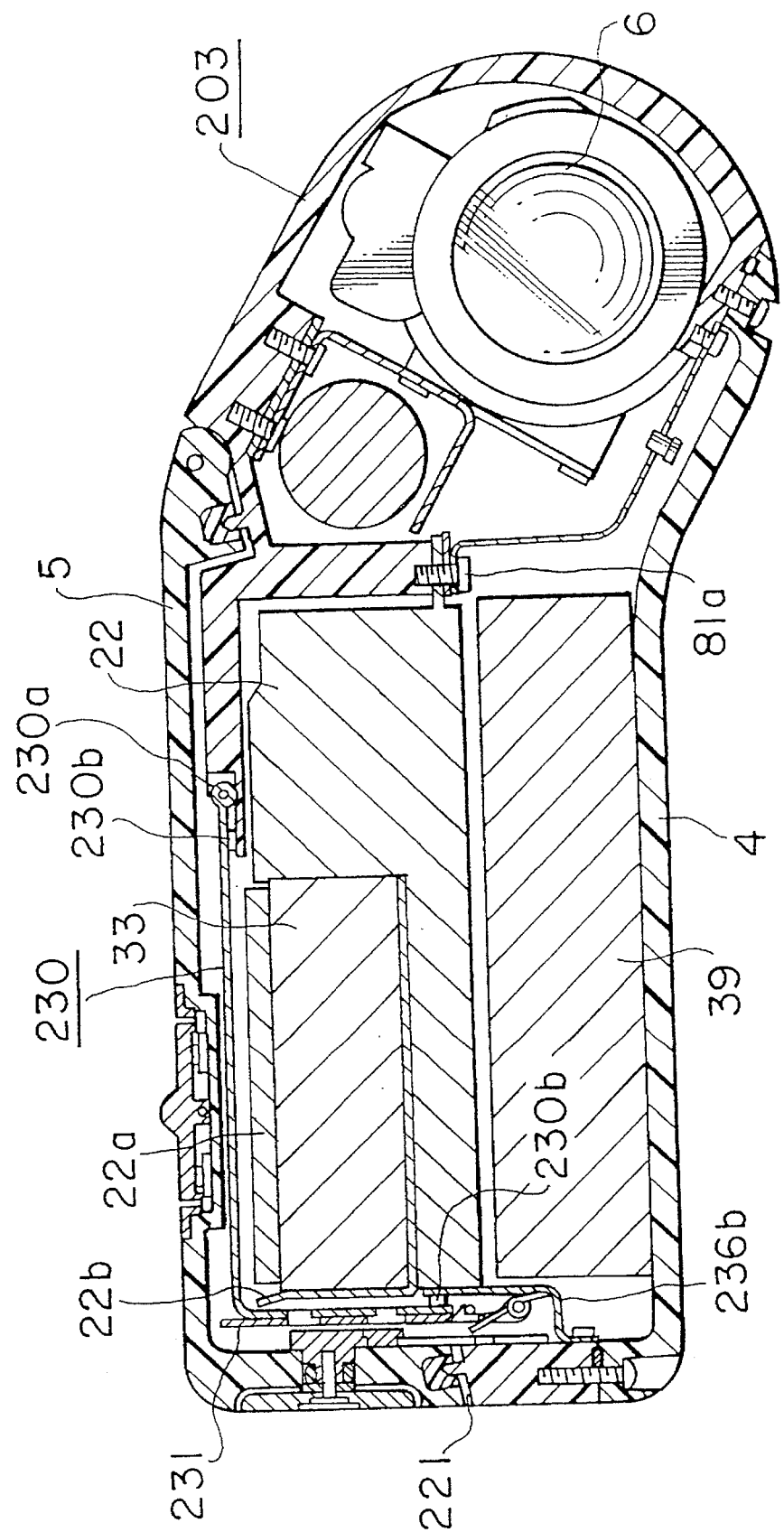
FIG. 18 is a sectional view of a video camera recorder as a fourth embodiment of the present invention, taken along the line XVIII—XVIII of FIG. 11.
Figure 19:
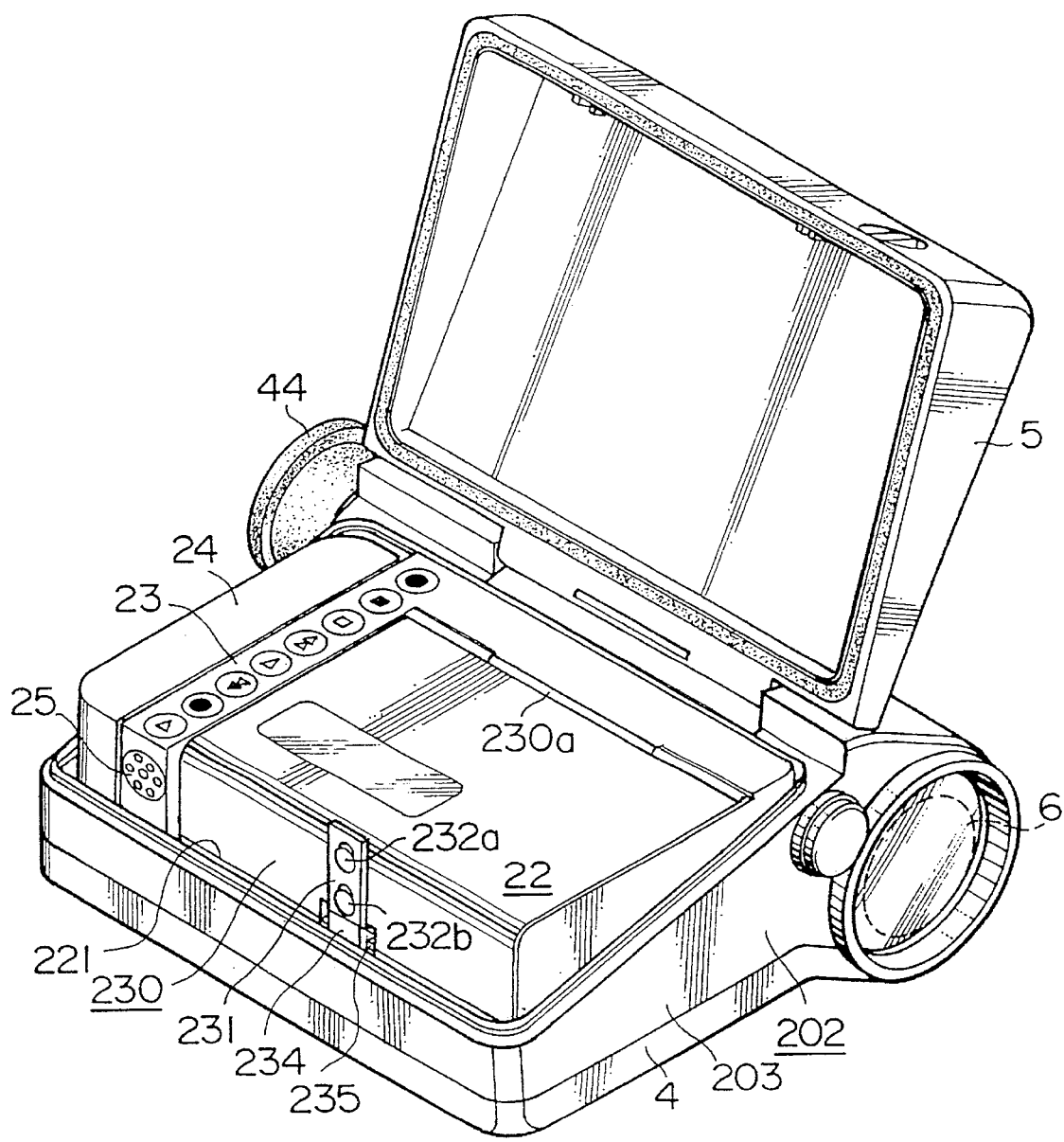
FIG. 19 is a perspective view of the video camera recorder of FIG. 18, with the closure opened.
Figure 23:
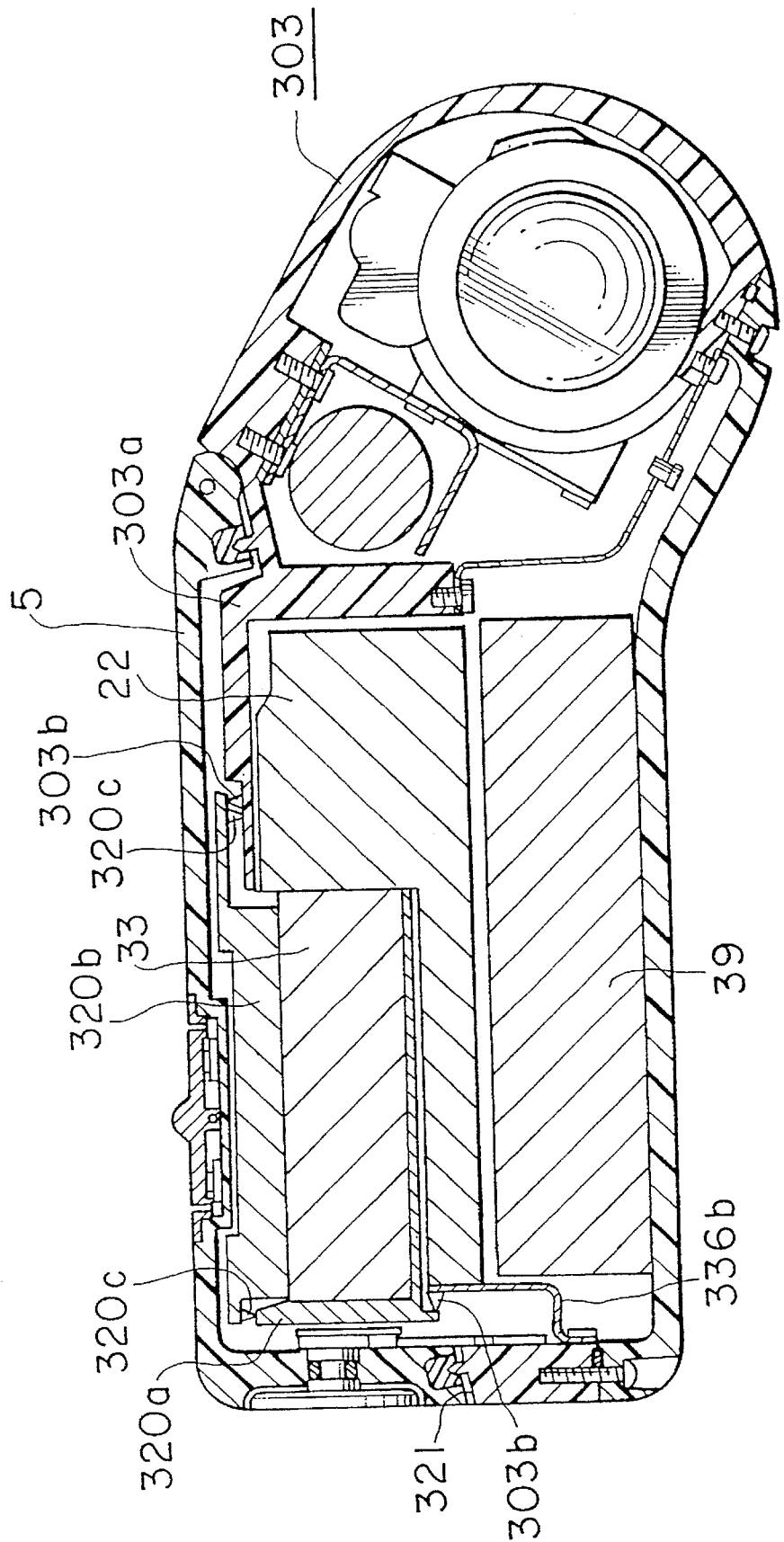
FIG. 23 is a sectional view of the video camera recorder as a sixth embodiment of the present invention, taken along the line XXIII—XXIII of FIG. 11.
Figure 24:
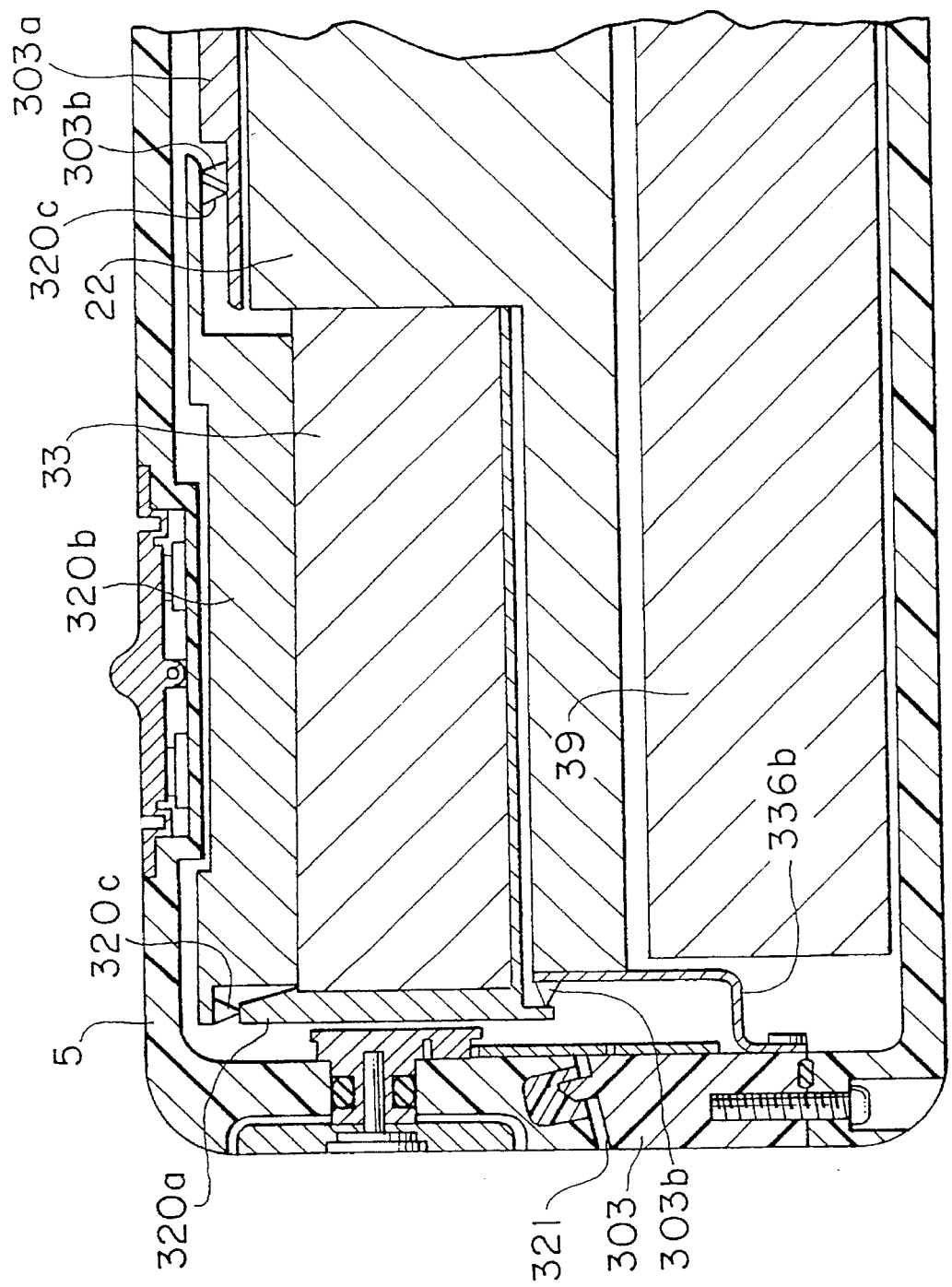
FIG. 24 is a fragmentary sectional view of the video camera recorder of FIG. 23, taken along the line XXIV—XXIV of FIG. 11.

In FIGS. 23 and 24, there is illustrated a sixth embodiment of the present invention, in which only parts which are distinct from parts of the fourth embodiment described with reference to FIGS. 18 to 20 will be described. An inner housing 303a is integrally formed with the housing body 303 between the closure 5 and the video deck 22, and an endless inner housing packing belt 303b is secured between the inner housing 303a and an equipment holder plate 336b. A video tape cassette 33 is placed into a cassette holder 320a, and a holder cover 320b is covered over the video tape cassette 33. A holder packing 320c is attached to the holder cover 320b. The inner case packing 303b contacts the holder cover 320b and the cassette holder 320a. The holder packing 320c contacts both the inner housing 303a and the cassette holder 320a. The inner housing packing 303b and the holder packing 320c provide a watertight structure to the chamber in which the video deck 22 and the electronic circuit 39 are located. Thus, even if a water leakage takes place through the opening portion 321, the video deck 22 and the electronic circuit 39 are protected from the leakage. Watertightness in the cassette holder 320a and the holder cover 320b is ensured by bringing the cassette holder 320a into contact with the inner housing packing 303b and further by bringing both the cassette holder 320a and the holder cover 320b into contact with the holder packing 320c. Thus, the video camera recorder of this embodiment does not need the cover 130, 230 of the third and fourth embodiments. This eliminates the operations of opening and closing the cover 130, 230.

What is claimed is:

1. An electronic apparatus comprising:

a watertight housing having first opening defining means for defining a first opening in the housing and second opening defining means for defining a second opening in the first opening of the housing, a first closure member adapted for movement for covering said first opening defining means, electronic equipment provided in said housing, a second closure member provided between said first closure member and said electronic equipment and adapted for movement for covering said second opening defining means, water sealing means provided between said second closure member and said housing, and press means provided between said first closure member and said second closure member or between said housing and said second closure member for forcing said second closure member towards said housing with said water sealing means therebetween to establish water tightness therebetween, wherein said press means comprises said first closure member and a cover holder interposed between said first and said second closure member such that a force, with which said first closure member is closed, acts to press said second closure member against said housing with said cover holder therebetween.

2. An electronic apparatus comprising:

a watertight housing having first opening defining means for defining a first opening in the housing and second opening defining means for defining a second opening in the first opening of the housing, a first closure member adapted for movement for covering said first opening defining means, electronic equipment provided in said housing, a second closure member provided between said first closure member and said electronic equipment and adapted for movement covering said second opening defining means, water sealing means provided between said second closure member and said housing, and press means provided between said first closure member and said second closure member or between said housing and said second closure member for forcing said second closure member towards said housing with said water sealing means therebetween to establish water tightness therebetween, wherein said press means comprises a locking mechanism provided between said watertight housing and said second closure member such that a force, with which said locking mechanism is set, acts to press said second closure member against said housing.

3. An electronic apparatus comprising:

a watertight housing having first opening defining means for defining a first opening in the housing and second opening defining means for defining a second opening in the first opening of the housing, a first closure member adapted for movement for covering said first opening defining means, electronic equipment provided in said housing said electronic equipment including a cassette holder, a second closure member provided between said first closure member and said electronic equipment and adapted for movement for covering said second opening defining means, wherein said second closure member comprises a cover for said cassette bolder, water sealing means provided between said second closure member and said housing, and press means for forcing said second closure member towards said housing with said water sealing means therebetween to establish water tightness therebetween when a cassette is inserted into said cassette holder.

4. An electronic apparatus as recited in claim 1, wherein the electronic equipment comprises a video deck.

5. An electronic apparatus as recited in claim 1, wherein the electronic equipment comprises a video camera.

6. An electronic apparatus as recited in claim 1, further comprising water absorbing means for absorbing leakage water, said water absorbing means are disposed within a recess provided between said first opening defined by said first opening defining means and said second opening defined by said second opening defining means, and wherein said water absorbing means comprises a water absorptive polymer.

7. An electronic apparatus as recited in claim 3, wherein the electronic equipment comprises a video deck.

8. An electronic apparatus as recited in claim 3, wherein the electronic equipment comprises a video camera.

9. An electronic apparatus as recited in claim 2, wherein the electronic equipment comprises a video deck.

10. An electronic apparatus as recited in claim 2, wherein the electronic equipment comprises a video camera.

\* \* \* \* \*